(12) United States Patent
Park et al.

(10) Patent No.: US 11,496,183 B2
(45) Date of Patent: Nov. 8, 2022

(54) METHOD FOR CONTROLLING 5G ANTENNA AND ELECTRONIC DEVICE THEREFOR

(71) Applicant: Samsung Electronics Co., Ltd., Suwon-si (KR)

(72) Inventors: Jungsik Park, Suwon-si (KR); Wonjoon Choi, Suwon-si (KR); Youngkyun Jang, Suwon-si (KR); Seunggil Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

(21) Appl. No.: 16/881,640

(22) Filed: May 22, 2020

(65) Prior Publication Data

US 2020/0382162 A1  Dec. 3, 2020

(30) Foreign Application Priority Data

May 27, 2019 (KR) .......................... 10-2019-0062152

(51) Int. Cl.

| | |
|---|---|
| *H04W 88/00* | (2009.01) |
| *H04B 3/52* | (2006.01) |
| *H04B 3/54* | (2006.01) |
| *H01Q 13/24* | (2006.01) |
| *H01Q 1/24* | (2006.01) |
| *H04B 1/401* | (2015.01) |

(52) U.S. Cl.
CPC .............. *H04B 3/52* (2013.01); *H01Q 1/243* (2013.01); *H01Q 13/24* (2013.01); *H04B 1/401* (2013.01); *H04B 3/54* (2013.01)

(58) Field of Classification Search
CPC ..... G01S 5/12; G01S 5/14; G01S 5/28; G01S 5/30; G01S 7/10; G01S 7/62; G01S 13/06; G01S 13/887; H04B 1/0064; H04B 1/401; H04B 3/52; H04B 3/54; H04B 17/103; H01Q 9/0407; H01Q 9/285; H01Q 13/24; H01Q 1/243; H01Q 21/08; H01Q 21/28; H04W 52/38
See application file for complete search history.

(56) References Cited

U.S. PATENT DOCUMENTS

| | | |
|---|---|---|
| 6,542,436 B1 | 4/2003 | Myllyla |
| 8,781,420 B2 | 7/2014 | Schlub et al. |
| 9,071,336 B2 | 6/2015 | Schlub et al. |

(Continued)

FOREIGN PATENT DOCUMENTS

| | | |
|---|---|---|
| KR | 10-2015-0094240 A | 8/2015 |
| KR | 10-2016-0025406 A | 3/2016 |

OTHER PUBLICATIONS

International Search Report dated Sep. 14, 2020, issued in International Application No. PCT/KR2020/006677.

*Primary Examiner* — Frank Duong
(74) *Attorney, Agent, or Firm* — Jefferson IP Law, LLP

(57) ABSTRACT

An electronic device including a second wireless communication circuit providing second radio access technology (RAT) and a communication processor controlling the second wireless communication circuit are provided. The communication processor may allocate a detection symbol for detecting an external object, may detect the external object from the allocated symbol, and may control the second wireless communication circuit based on the detected external object.

15 Claims, 17 Drawing Sheets

(56) References Cited

U.S. PATENT DOCUMENTS

| | | | |
|---|---|---|---|
| 9,144,051 B2 | 9/2015 | Peter | |
| 9,151,836 B2 | 10/2015 | Lee et al. | |
| 9,179,299 B2 | 11/2015 | Schlub et al. | |
| 9,766,324 B2 | 9/2017 | Katz et al. | |
| 9,769,769 B2 | 9/2017 | Harper et al. | |
| 9,971,028 B2 | 5/2018 | Park | |
| 10,120,065 B2 | 11/2018 | Chou | |
| 2013/0027242 A1 | 1/2013 | Lee et al. | |
| 2013/0210477 A1 | 8/2013 | Peter | |
| 2015/0226848 A1 | 8/2015 | Park | |
| 2015/0249916 A1 | 9/2015 | Schlub et al. | |
| 2015/0382307 A1 | 12/2015 | Harper et al. | |
| 2016/0327634 A1 | 11/2016 | Katz et al. | |
| 2017/0016980 A1 | 1/2017 | Chou | |
| 2018/0278318 A1* | 9/2018 | Chakraborty | H04W 52/146 |
| 2018/0287651 A1 | 10/2018 | Fernando et al. | |
| 2019/0383924 A1* | 12/2019 | Mehdizad Taleie | G01S 7/006 |
| 2020/0033442 A1* | 1/2020 | Gulati | G01S 7/0234 |
| 2020/0150263 A1* | 5/2020 | Eitan | G01S 13/86 |
| 2020/0300996 A1* | 9/2020 | Cetinoneri | G01S 7/024 |
| 2021/0318423 A1* | 10/2021 | Wang | G01S 13/04 |
| 2021/0377936 A1* | 12/2021 | Yuan | H04W 72/0426 |

* cited by examiner

METHOD FOR CONTROLLING 5G ANTENNA AND ELECTRONIC DEVICE THEREFOR

CROSS-REFERENCE TO RELATED APPLICATION(S)

This application is based on and claims priority under 35 U.S.C. § 119(a) of a Korean patent application number 10-2019-0062152, filed on May 27, 2019, in the Korean Intellectual Property Office, the disclosure of which is incorporated by reference herein in its entirety.

BACKGROUND

1. Field

The disclosure relates to a method for controlling a 5th generation (5G) antenna and an electronic device therefor.

2. Description of Related Art

With the development of a mobile communication technology, an electronic device equipped with an antenna, such as a smartphone or a wearable device, is being widely supplied. The electronic device may receive or transmit a signal including data (e.g., a message, a photo, a video, a music file, or a game) through the antenna. The antenna of the electronic device may be implemented with a plurality of antenna elements to receive or transmit a signal more efficiently. For example, the electronic device may include one or more antenna arrays in each of which a plurality of antenna elements are arranged.

To improve data throughput, a wireless signal in a relatively high frequency band may be used. Because the antenna may have different characteristics depending on the frequency of a signal, different antennas may be used depending on the used frequency band. For example, an electronic device may use different antennas for a signal having the frequency below about 6 gigahertz (GHz) and a signal having the frequency above about 6 GHz.

In wireless communication, blockage may occur due to an object such as a grip by a user of an electronic device. The communication quality may be deteriorated due to the blockage. In addition, when an object causing the blockage is a person, the transmission may be restricted in consideration of the influence of electromagnetic waves. In particular, in the 5G mobile communication using a high-frequency signal, the deterioration in quality and the damage to electromagnetic waves may be increased.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device detecting external objects to control a wireless communication circuit, thereby reducing the deterioration in quality and the damage to electromagnetic waves.

Additional aspects will be set forth in part in the description which follows and, in part, will be apparent from the description, or may be learned by practice of the presented embodiments.

In accordance with an aspect of the disclosure, an electronic device is provided. The electronic device includes a second wireless communication circuit electrically connected to at least one antenna array including a plurality of antenna elements and providing a second radio access technology (RAT), a communication processor operatively connected to the second wireless communication circuit, and a memory operatively connected to the communication processor. The memory may store one or more instructions that, when executed, cause the communication processor to allocate an uplink symbol or a flexible symbol among a plurality of symbols indicated by slot format information, as a detection symbol, to detect an object by transmitting a signal in the detection symbol and receiving a reflection signal of the transmitted signal, using the second wireless communication circuit, and to control transmission of the second wireless communication circuit, based on the detected result of the object.

In accordance with another aspect of the disclosure, a transmission control method of an electronic device is provided. The transmission control method includes allocating an uplink symbol or a flexible symbol among a plurality of symbols indicated by slot format information, as a detection symbol, detecting an object by transmitting a signal in the detection symbol and receiving a reflection signal of the transmitted signal, using a second wireless communication circuit electrically connected to at least one antenna array including a plurality of antenna elements and configured to provide second RAT, and controlling transmission of the second wireless communication circuit, based on the detected result of the object.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
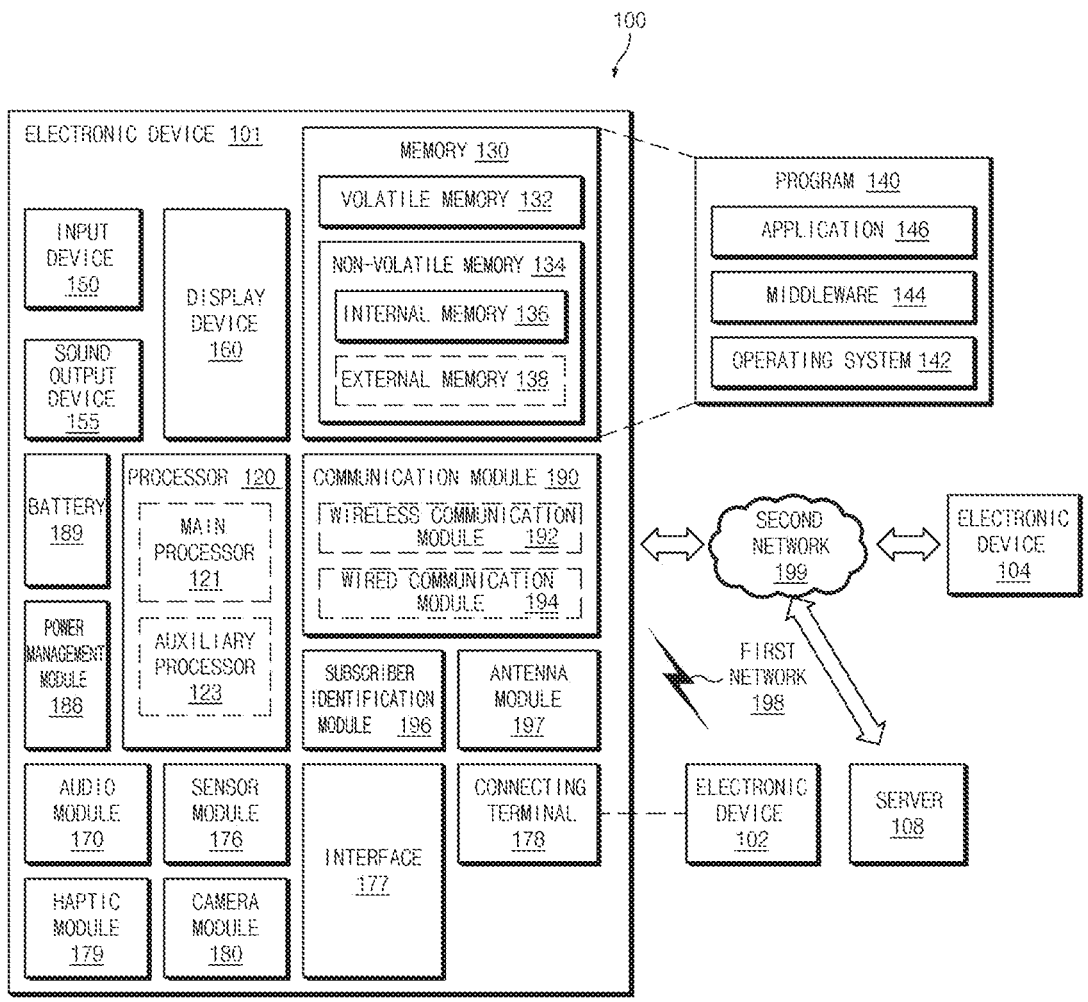
FIG. 1 illustrates a block diagram of an electronic device in a network according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory storage medium" means a tangible device, and does not include a signal (e.g., an electromagnetic wave), but this term does not differentiate between where data is semi-permanently stored in the storage medium and where the data is temporarily stored in the storage medium. For example, "the non-transitory storage medium" may include a buffer where data is temporally stored.

According to an embodiment, a method according to various embodiments of the disclosure may be included and provided in a computer program product. The computer program product may be traded as a product between a seller and a buyer. The computer program product (e.g., downloadable app)) may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
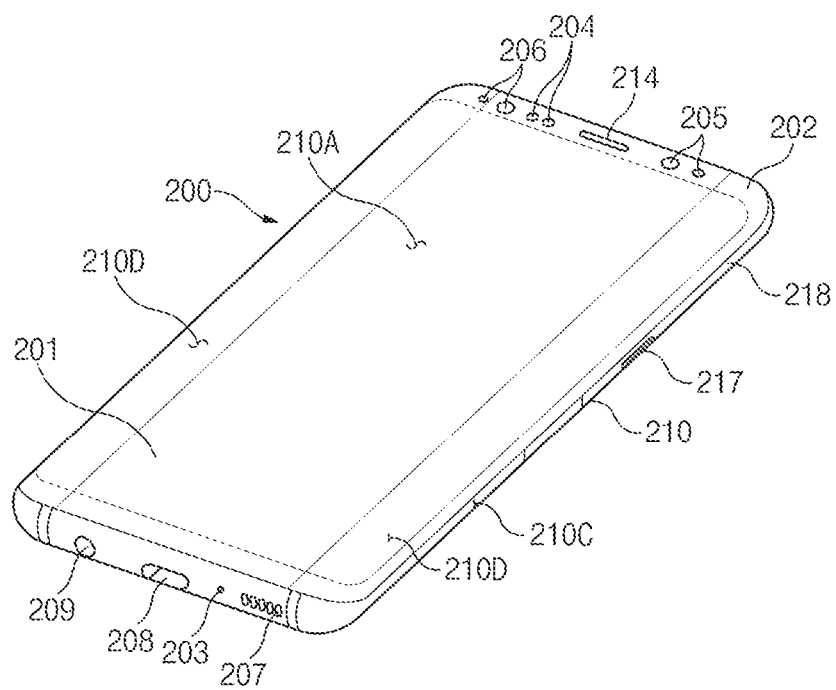
FIG. 2 is a perspective view of a mobile electronic device according to an embodiment of the disclosure.

FIG. 2 is a perspective view of a front surface of a mobile electronic device (e.g., the electronic device 101 of FIG. 1) according to an embodiment of the disclosure.

Figure 3:
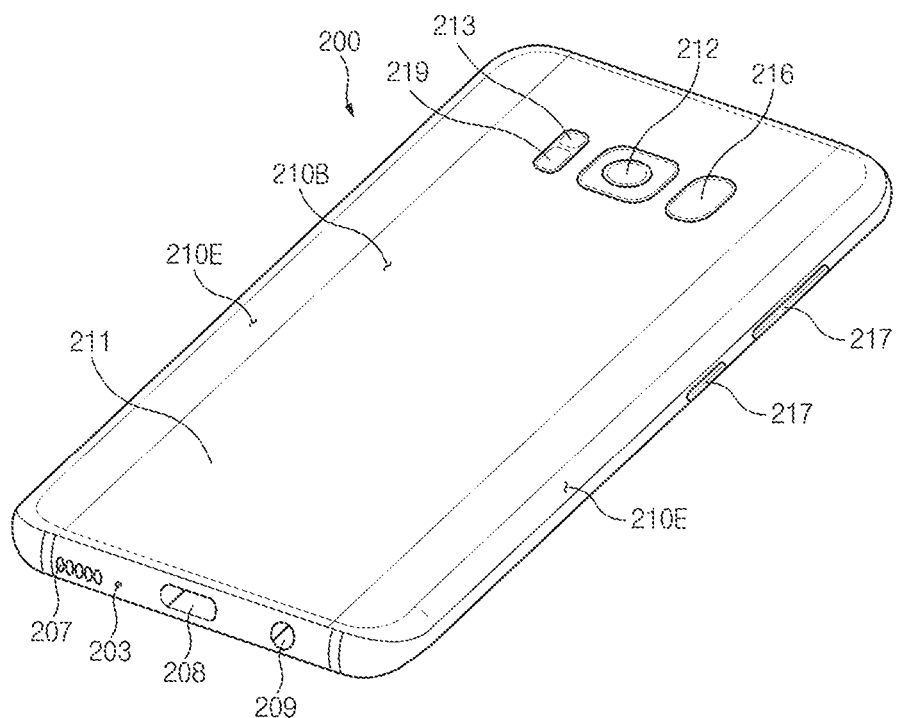
FIG. 3 is a perspective view of a rear surface of an electronic device according to an embodiment of the disclosure.

FIG. 3 is a perspective view of a rear surface of a mobile electronic device according to an embodiment of the disclosure.

Referring to FIGS. 2 and 3, a mobile electronic device 200 (e.g., the electronic device 101 of FIG. 1) according to an embodiment may include a housing 210 which includes a first surface (or a front surface) 210A, a second surface (or a rear surface) 210B, and a side surface 210C surrounding a space between the first surface 210A and the second surface 210B. In an embodiment (not illustrated), the housing may be referred to as a "structure" which forms a part of the first surface 210A, the second surface 210B, and side surfaces 210C. According to an embodiment, the first surface 210A may be formed by a first plate (or a front plate) 202 (e.g., a glass plate including various coating layers, or a polymer plate), at least a portion of which is substantially transparent. The second surface 210B may be formed by a rear plate 211 which is substantially opaque. For example, the rear plate 211 may be implemented with a coated or colored glass, a ceramic, a polymer, a metal (e.g., aluminum, stainless steel (STS), or magnesium), or the combination of at least two of the materials. The side surface 210C may be coupled with the front plate 202 and the rear plate 211, and may be formed by a side bezel structure (or a "side member") 218 including metal and/or polymer. In any embodiment, the rear plate 211 and the side bezel structure 218 may be integrally formed and may include the same material (e.g., a metal material such as aluminum).

In the embodiment that is illustrated, the front plate 202 may include two first regions 210D, which are bent toward the rear plate 211 from the first surface 210A so as to be seamlessly extended, at opposite long edges of the front plate 202. In the embodiment (refer to FIG. 3) that is illustrated, the rear plate 211 may include two second regions 210E, which are bent toward the front plate 202 from the second surface 210B so as to be seamlessly extended, at opposite long edges thereof. In an embodiment, the front plate 202 (or the rear plate 211) may include only one of the first regions 210D (or the second regions 210E). In an embodiment, a portion of the first regions 210D or the second regions 210E may not be included. In the embodiments, when viewed from the side surface of the electronic device 200, the side bezel structure 218 may have a first thickness (or width) on one side where the first region 210D or the second region 210E are not included, and may have a second thickness on one side where the first region 210D or the second region 210E are included. The second thickness may be smaller than the first thickness.

According to an embodiment, the electronic device 200 may include at least one or more of a display 201, an audio module (203, 207, 214), a sensor module (204, 216, 219), a camera module (205, 212, 213), key input devices 217, a light-emitting device 206, and a connector hole (208, 209). In an embodiment, the electronic device 200 may not include at least one (e.g., the key input devices 217 or the light-emitting device 206) of the components or may further include any other component.

The display 201 may be exposed through a considerable portion of the front plate 202, for example. In any embodiment, at least part of the display 201 may be exposed through the first surface 210A and the front plate 202 forming the first region 210D of the side surface 210C. In an embodiment, a corner of the display 201 may be formed to be mostly identical to a shape of an outer portion of the front plate 202 adjacent thereto. In an embodiment (not illustrated), to increase the area where the display 201 is exposed, a difference between an outer portion of the display 201 and an outer portion of the front plate 202 may be formed mostly identically.

In an embodiment (not illustrated), a recess or an opening may be formed in a portion of a screen display region of the display 201, and at least one or more of the audio module 214, the sensor module 204, the camera module 205, and the light-emitting device 206 may be provided to be aligned with the recess or the opening. In an embodiment (not illustrated), at least one or more of the audio module 214, the sensor module 204, the camera module 205, the fingerprint sensor 216, and the light-emitting device 206 may be provided on a back surface of the display 201, which corresponds to the screen display region. In an embodiment (not illustrated), the display 201 may be combined with a touch sensing circuit, a pressure sensor capable of measuring the intensity (or pressure) of a touch, and/or a digitizer capable of detecting a magnetic stylus pen or may be disposed adjacent thereto. In any embodiment, at least part of the sensor module (204, 219) and/or at least part of the key input device (217) may be disposed in the first region 210D and/or the second region 210E.

The audio module (203, 207, 214) may include the microphone hole 203 and the speaker hole (207, 214). A microphone for obtaining external sound may be disposed inside the microphone hole 203; in any embodiment, a plurality of microphones may be disposed inside the microphone hole 203. The speaker hole (207, 214) may include the external speaker hole 207 and the receiver hole 214 for making a call. In any embodiment, the speaker hole (207, 214) and the microphone hole 203 may be implemented with one hole, or a speaker (e.g., a piezo speaker) may be included without the speaker hole (207, 214).

The sensor module (204, 216, 219) may generate an electrical signal or a data value corresponding to an internal operation state of the electronic device 200 or corresponding to an external environment state. The sensor module (204, 216, 219) may include, for example, the first sensor module 204 (e.g., a proximity sensor) and/or a second sensor module (not illustrated) (e.g., a fingerprint sensor) disposed on the first surface 210A of the housing 210, and/or the third sensor module 219 (e.g., a heart rate monitor (HRM) sensor) and/or the fourth sensor module 216 (e.g., a fingerprint sensor) disposed on the second surface 210B of the housing 210. The fingerprint sensor may be positioned on the second surface 210B as well as the first surface 210A (e.g., the display 201) of the housing 210. The electronic device 200 may further include a sensor module not illustrated, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or the illumination sensor 204.

The camera module (205, 212, 213) may include the first camera device 205 positioned on the first surface 210A of the electronic device 200, and the second camera module 212 and/or the flash 213 positioned on the second surface 210B. The camera module (205, 212) may include one or more lenses, an image sensor, and/or an image signal processor. The flash 213 may include, for example, a light emitting diode or a xenon lamp. In an embodiment, two or more lenses (e.g., an infrared camera and wide-angle and telephoto lenses) and image sensors may be disposed on one surface of the electronic device 200.

The key input devices 217 may be disposed on the side surface 210C of the housing 210. In another embodiment, the electronic device 200 may not include all or a part of the key input devices 217, and the key input device 217 not included may be implemented on the display 201 in the form of a soft key. In an embodiment, a key input device may include the sensor module 216 disposed on the second surface 210B of the housing 210.

The light-emitting device 206 may be disposed, for example, on the first surface 210A of the housing 210. The light-emitting device 206 may provide status information of the electronic device 200, for example, in the form of light. In an embodiment, the light-emitting device 206 may provide, for example, a light source that operates in conjunction with an operation of the camera module 205. The light-emitting device 206 may include, for example, a light-emitting diode (LED), an IR LED, and a xenon lamp.

The connector hole (208, 209) may include the first connector hole 208 that is capable of accommodating a connector (e.g., a USB connector) for transmitting/receiving a power and/or data to/from an external electronic device, and/or the second connector hole (or an earphone jack) 209 that is capable of accommodating a connector for transmitting/receiving an audio signal to/from the external electronic device.

Figure 4:
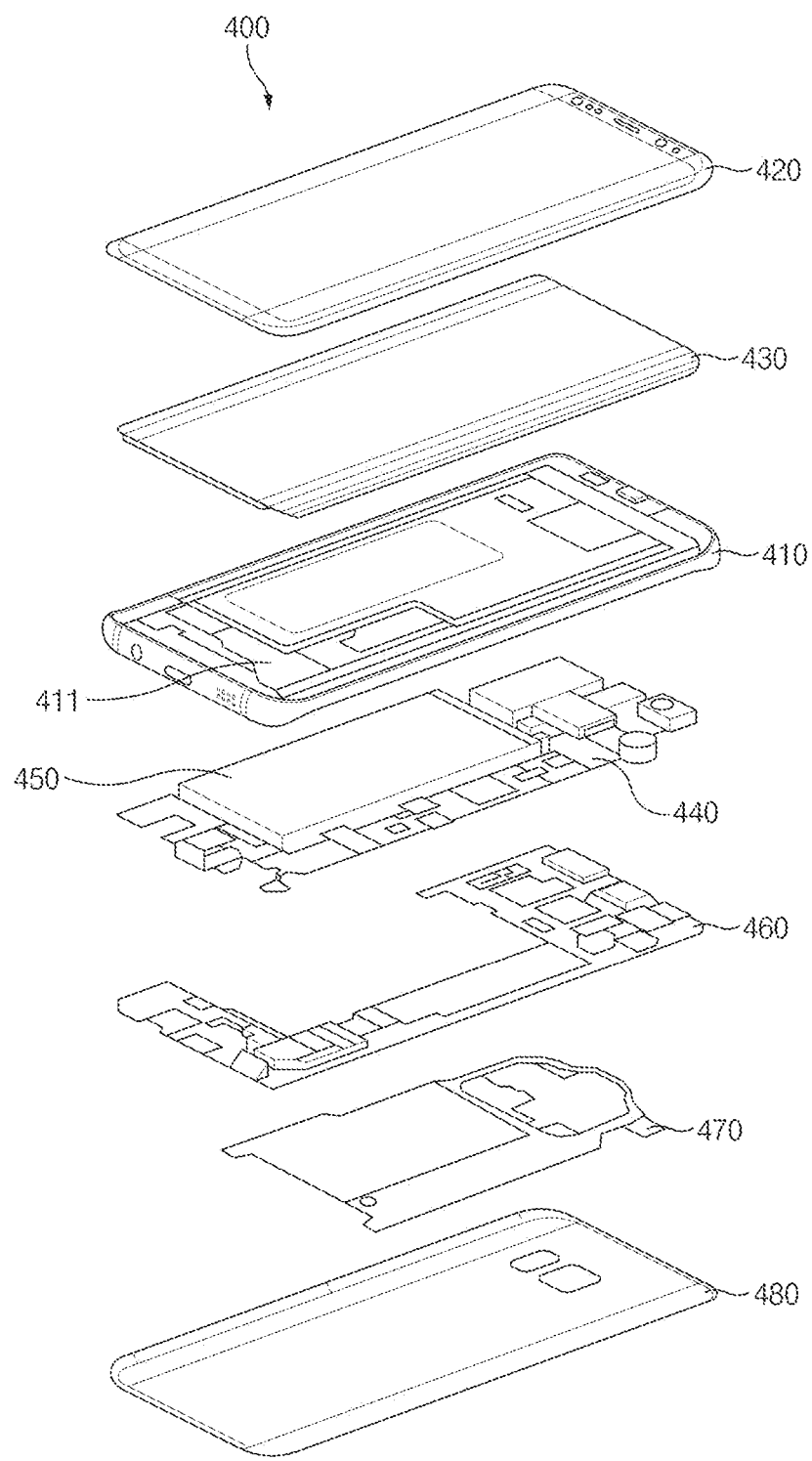
FIG. 4 is an exploded perspective view of a mobile electronic device according to an embodiment of the disclosure.

FIG. 4 is an exploded perspective view of a mobile electronic device according to an embodiment of the disclosure.

Referring to FIG. 4, a mobile electronic device 400 (e.g., the mobile electronic device 200 of FIG. 2) may include a side bezel structure 410, a first support member 411 (e.g., a bracket), a front plate 420, a display 430, a printed circuit board 440, a battery 450, a second support member 460 (e.g., a rear case), an antenna 470, and a rear plate 480. In any embodiment, the electronic device 400 may not include at least one (e.g., the first support member 411 or the second support member 460) of the components or may further include any other component. At least one of the components of the electronic device 400 may be identical or similar to at least one of the components of the electronic device 200 of FIG. 2 or 3, and thus, additional description will be omitted to avoid redundancy.

The first support member 411 may be disposed inside the electronic device 400, and may be connected to the side bezel structure 410 or may be integrally formed with the side bezel structure 410. The first support member 411 may be formed of, for example, a metal material and/or a nonmetal material (e.g., polymer). The display 430 may be coupled with one surface of the first support member 411, and the printed circuit board 440 may be coupled with an opposite surface of the first support member 411. A processor, a memory, and/or an interface may be mounted on the printed circuit board 440. For example, the processor may include one or more of a central processing unit, an application processor, a graphic processing device, an image signal processor, a sensor hub processor, or a communication processor.

Figure 5:
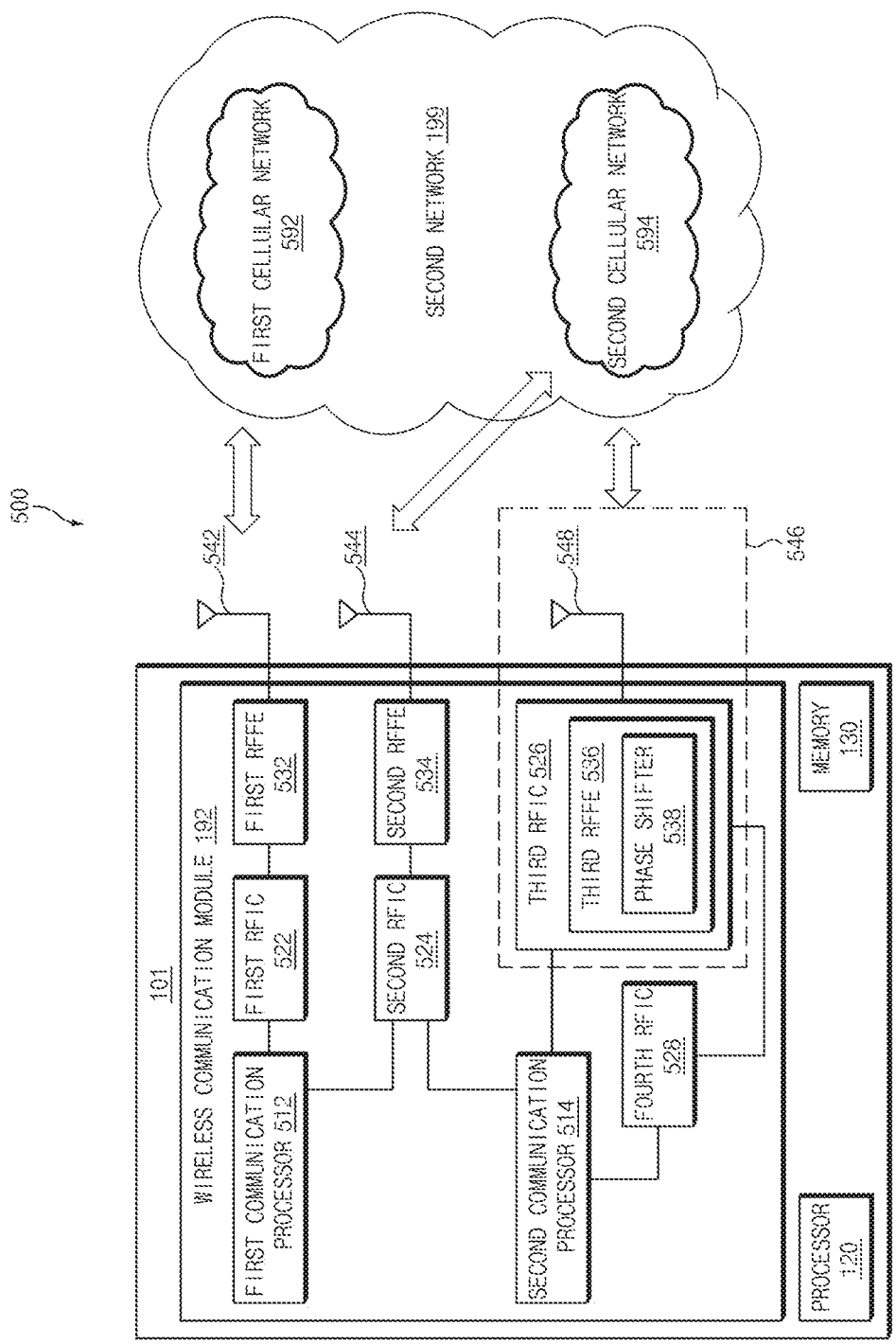
FIG. 5 is a block diagram of an electronic device for supporting legacy network communication and 5G network communication according to an embodiment of the disclosure.

FIG. 5 is a block diagram of an electronic device for supporting legacy network communication and 5G network communication according to an embodiment of the disclosure.

Referring to FIG. 5, the electronic device 101 may include a first communication processor 512, a second communication processor 514, a first radio frequency integrated circuit (RFIC) 522, a second RFIC 524, a third RFIC 526, a fourth RFIC 528, a first radio frequency front end (RFFE) 532, a second RFFE 534, a first antenna module 542, a second antenna module 544, and an antenna 548. The electronic device 101 may further include the processor 120 and the memory 130. The second network 199 may include a first cellular network 592 and a second cellular network 594. According to another embodiment, the electronic device 101 may further include at least one of the components described in FIG. 1, and the second network 199 may further include at least one other network. According to an embodiment, the first communication processor 512, the second communication processor 514, the first RFIC 522, the second RFIC 524, the fourth RFIC 528, the first RFFE 532, and the second RFFE 534 may form at least part of the wireless communication module 192. According to another embodiment, the fourth RFIC 528 may be omitted or included as the part of the third RFIC 526.

The first communication processor 512 may support the establishment of a communication channel of a band to be used for wireless communication with the first cellular network 592 and the legacy network communication through the established communication channel. According to an embodiment, the first cellular network 592 may be a legacy network including 2nd generation (2G), 3rd generation (3G), 4th generation (4G), and/or long term evolution (LTE) network. The second communication processor 514 may support the establishment of a communication channel corresponding to a specified band (e.g., about 6 GHz~about 60 GHz) among bands to be used for wireless communication with the second cellular network 594 and 5G network communication via the established communication channel According to an embodiment, the second cellular network 594 may be 5G network defined in 3rd generation partnership project (3GPP). Additionally, according to an embodiment, the first communication processor 512 or the second communication processor 514 may establish a communication channel for a specified band (e.g., about 6 GHz or lower) of the bands to be used for wireless communication with the second cellular network 594 and may support 5G network communication through the established communication channel According to an embodiment, the first communication processor 512 and the second communication processor 514 may be implemented within a single chip or a single package. According to an embodiment, the first communication processor 512 or the second communication processor 514 may be implemented within a single chip or a single package with the processor 120, the auxiliary processor 123 of FIG. 1, or the communication module 190 of FIG. 1.

At the time of transmission, the first RFIC 522 may convert a baseband signal generated by the first communication processor 512 to a radio frequency (RF) signal of about 700 megahertz (MHz) to about 3 GHz used for the first cellular network 592 (e.g., a legacy network). At the time of reception, the RF signal may be obtained from the first cellular network 592 (e.g., a legacy network) via an antenna (e.g., the first antenna module 542) and may be preprocessed via RFFE (e.g., the first RFFE 532). The first RFIC 522 may convert the pre-processed RF signal into a baseband signal so as to be processed by the first communication processor 512.

In the case of transmitting a signal, the second RFIC 524 may convert a baseband signal generated by the first communication processor 512 or the second communication processor 514 into an RF signal (hereinafter referred to as a "5G Sub6 RF signal") in a Sub6 band (e.g., about 6 GHz or lower) used in the second cellular network 594 (e.g., a 5G network). At the time of reception, the 5G Sub6 RF signal may be obtained from the second cellular network 594 (e.g., 5G network) via an antenna (e.g., the second antenna module 544) and may be preprocessed via RFFE (e.g., the second RFFE 534). The second RFIC 524 may convert the pre-processed 5G Sub6 RF signal into a baseband signal so as to be processed by a communication processor corresponding to the 5G Sub6 RF signal from among the first communication processor 512 or the second communication processor 514.

The third RFIC 526 may convert a baseband signal generated by the second communication processor 514 into an RF signal (hereinafter referred to as a "5G Above6 RF signal") in a 5G Above6 band (e.g., approximately 6 GHz to approximately 60 GHz) to be used in the second cellular network 594 (e.g., a 5G network). In the case of receiving a signal, the 5G Above6 RF signal may be obtained from the second cellular network 594 (e.g., a 5G network) through an antenna (e.g., the antenna 548) and may be pre-processed through a third RFFE 536. For example, the third RFFE 536 may perform preprocessing of a signal, using a phase shifter 538. The third RFIC 526 may convert the preprocessed 5G Above6 RF signal to a baseband signal so as to be processed by the second communication processor 514. According to an embodiment, the third RFFE 536 may be implemented as a part of the third RFIC 526.

According to an embodiment, the electronic device 101 may include the fourth RFIC 528 independent of the third RFIC 526 or as at least part thereof. In this case, the fourth RFIC 528 may convert the baseband signal generated by the second communication processor 514, to an RF signal (hereinafter referred to as an intermediate frequency (IF) signal) of an intermediate frequency band (e.g., about 9 GHz~about 11 GHz) and then may transmit the IF signal to the third RFIC 526. The third RFIC 526 may convert the IF signal to the 5G Above6 RF signal. In the case of receiving a signal, the 5G Above6 RF signal may be received from the second cellular network 594 (e.g., a 5G network) through an antenna (e.g., the antenna 548) and may be converted into an IF signal by the third RFIC 526. The fourth RFIC 528 may convert the IF signal into a baseband signal so as to be processed by the second communication processor 514.

According to an embodiment, the first RFIC 522 and the second RFIC 524 may be implemented with a part of a single chip or a single package. According to an embodiment, the first RFFE 532 and the second RFFE 534 may be implemented with a part of a single chip or a single package. According to an embodiment, at least one of the first antenna module 542 or the second antenna module 544 may be omitted or may be combined with any other antenna module to process RF signals in a plurality of bands.

According to an embodiment, the third RFIC 526 and the antenna 548 may be disposed at the same substrate to form a third antenna module 546. For example, the wireless communication module 192 or the processor 120 may be disposed on a first substrate (e.g., a main PCB). In this case, the third RFIC 526 may be disposed in a partial region (e.g., on a lower surface) of a second substrate (e.g., a sub PCB) independent of the first substrate, and the antenna 548 may be disposed in another partial region (e.g., on an upper surface) of the second substrate. As such, the third antenna module 546 may be formed. According to an embodiment, for example, the antenna 548 may include an antenna array capable of being used for beamforming. It is possible to reduce the length of the transmission line between the third RFIC 526 and the antenna 548 by positioning the third RFIC 526 and the antenna 548 on the same substrate. The decrease in the transmission line may make it possible to reduce the loss (or attenuation) of a signal in a high-frequency band (e.g., approximately 6 GHz to approximately 60 GHz) used for the 5G network communication due to the transmission line. For this reason, the electronic device 101 may improve the quality or speed of communication with the second cellular network 594 (e.g., 5G network).

The second cellular network 594 (e.g., a 5G network) may be used independently of the first cellular network 592 (e.g., a legacy network) (e.g., stand-alone (SA)) or may be used in conjunction with the first cellular network 592 (e.g., non-standalone (NSA)). For example, only an access network (e.g., a 5G radio access network (RAN) or a next generation RAN (NG RAN)) may be present in the 5G network, and a core network (e.g., a next generation core (NGC)) may be absent from the 5G network. In this case, the electronic device 101 may access the access network of the 5G network and may then access an external network (e.g., Internet) under control of the core network (e.g., an evolved packed core (EPC)) of the legacy network. Protocol information (e.g., LTE protocol information) for communication with the legacy network or protocol information (e.g., New Radio NR protocol information) for communication with the 5G network may be stored in the memory 130 and may be accessed by another component (e.g., the processor 120, the first communication processor 512, or the second communication processor 514).

Figure 6:
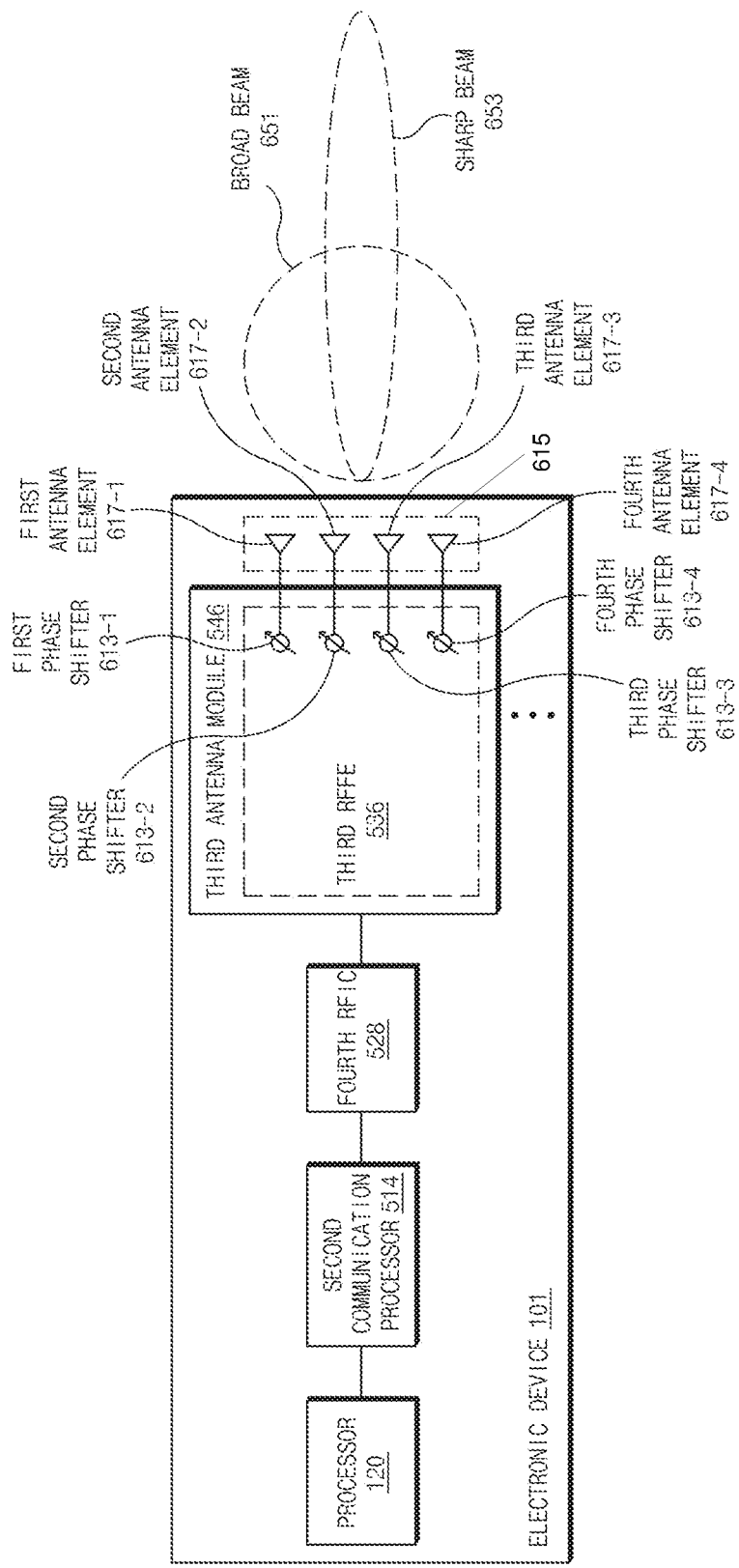
FIG. 6 is a block diagram of an electronic device for 5G network communication according to an embodiment of the disclosure.

FIG. 6 is a block diagram of an electronic device for 5G network communication according to an embodiment of the disclosure.

The electronic device 101 may include various components illustrated in FIG. 5; however, in FIG. 6, for a brief description, it is described that the electronic device 101 includes the processor 120, the second communication processor 514, the fourth RFIC 528, and at least one third antenna module 546.

Referring to FIG. 6, the third antenna module 546 may include first to fourth phase shifters 613-1 to 613-4 (e.g., the phase shifter 538 of FIG. 5) and/or first to fourth antenna elements 617-1 to 617-4 (e.g., the antenna 548 of FIG. 5). Each one of the first to fourth antenna elements 617-1 to 617-4 may be electrically connected to individual one of the first to fourth phase shifters 613-1 to 613-4. The first to fourth antenna elements 617-1 to 617-4 may form at least one antenna array 615.

The second communication processor 514 may control the phases of signals transmitted and/or received through the first to fourth antenna elements 617-1 to 617-4 by controlling the first to fourth phase shifters (613-1 to 613-4), and thus may generate Tx beam and/or Rx beam in the selected direction.

According to an embodiment, the third antenna module 546 may form a beam 651 (hereinafter referred to as "broad beam") of the wide radiation pattern or a beam 653 (hereinafter referred to as "sharp beam") of the narrow radiation pattern, which is described above, depending on the number of antenna elements used. For example, when the third antenna module 546 uses all of the first to fourth antenna elements 617-1 to 617-4, the third antenna module 546 may form the sharp beam 653; when the third antenna module 546 uses only the first antenna element 617-1 and the second antenna element 617-2, the third antenna module 546 may form the broad beam 651. The broad beam 651 may have a wider coverage than the sharp beam 653 but may have less antenna gain, and thus it may be more effective upon searching for a beam. On the other hand, the sharp beam 653 may have a narrower coverage than the broad beam 651. However, the antenna gain may be higher, thereby improving communication performance.

According to an embodiment, the second communication processor 514 may utilize the sensor module 176 (e.g., a 9-axis sensor, a grip sensor, or GPS) for beam search. For example, the electronic device 101 may adjust the search location of a beam and/or a beam search period based on the location and/or movement of the electronic device 101, using the sensor module 176. For another example, when the electronic device 101 is gripped by a user, the electronic device 101 may select an antenna module having better communication performance among the plurality of third antenna modules 546 by grasping the user's gripping portion using a grip sensor.

Figure 7:
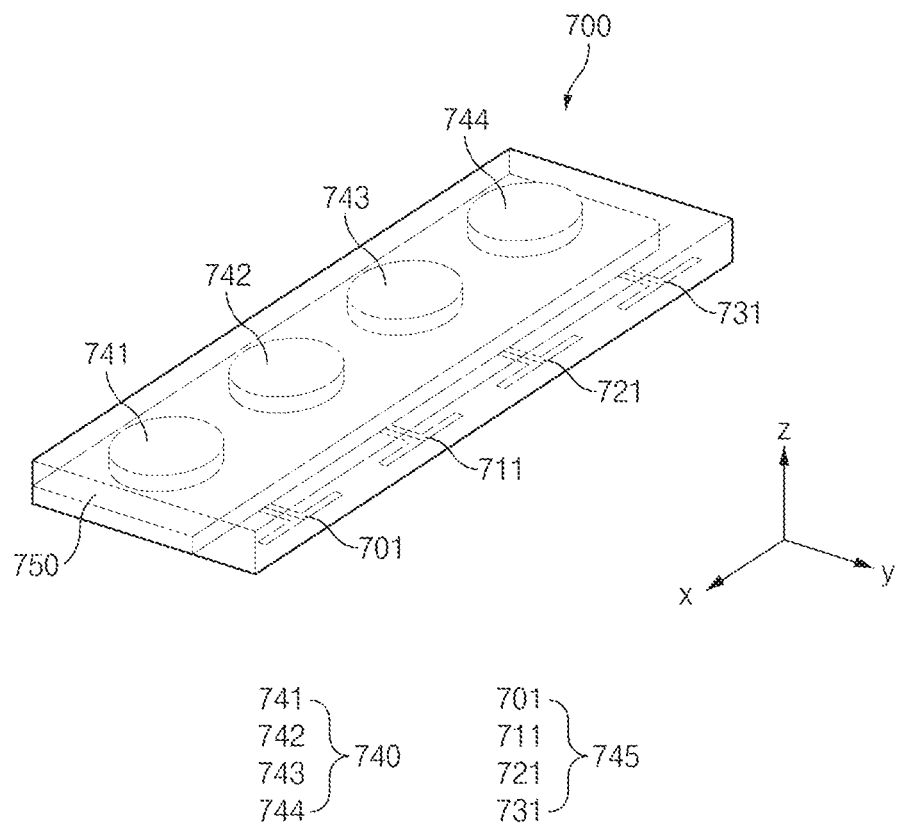
FIG. 7 is a perspective view of an antenna module according to an embodiment of the disclosure.

FIG. 7 is a perspective view of an antenna module according to an embodiment of the disclosure.

Referring to FIG. 7, according to an embodiment, an antenna module 700 (e.g., the third antenna module 546 of FIG. 6) may include a first antenna array 740 and a second antenna array 745, which are disposed on the first surface (e.g., the direction parallel to the X-Y plane and facing the +Z axis) of a printed circuit board (PCB) 750 or in the PCB 750. The antenna module 700 may include at least one communication circuit (not shown) (e.g., the third RFIC 526 in FIG. 5) disposed on the second surface (e.g., the direction parallel to the X-Y plane and facing the −Z axis) of the PCB 750. For example, the first antenna array 740 may include a first antenna element 741 (e.g., the first antenna element 617-1 of FIG. 6), a second antenna element 742 (e.g., the second antenna element 617-2 of FIG. 6), a third antenna element 743 (e.g., the third antenna element 617-3 of FIG. 6), and/or a fourth antenna element 744 (e.g., the fourth antenna element 617-4 of FIG. 6). For example, the second antenna array 745 may include a plurality of dipole antenna elements 701, 711, 721, and 731. For example, each of the dipole antenna elements 701, 711, 721, and 731 may transmit or receive signals, using a beam corresponding to the radiation pattern generated with respect to one side direction (e.g., +Y direction) of the antenna module 700. In the case of the dipole antenna elements 701, 711, 721, and 731, the dipole antenna elements 701, 711, 721, and 731 may have a null point in the longitudinal direction (e.g., X axis) of each of the dipole antenna elements 701, 711, 721, and 731. According to an embodiment, each of the antenna elements of the second antenna array 745 may be connected to the communication circuit (e.g., the fourth RFIC 528 in FIG. 6) through at least one transmission line formed through the inside of the PCB 750 via at least one feed point.

The first antenna array 740 and the second antenna array 745 are illustrated in FIG. 7 as being positioned on the same PCB 750, but embodiments of the disclosure are not limited thereto. For example, the first antenna array 740 may be positioned on the first PCB, and the second antenna array 745 may be positioned on the second PCB. For example, the first PCB and the second PCB may be electrically and/or physically connected through a flexible member (e.g., a flexible PCB).

Figure 8:
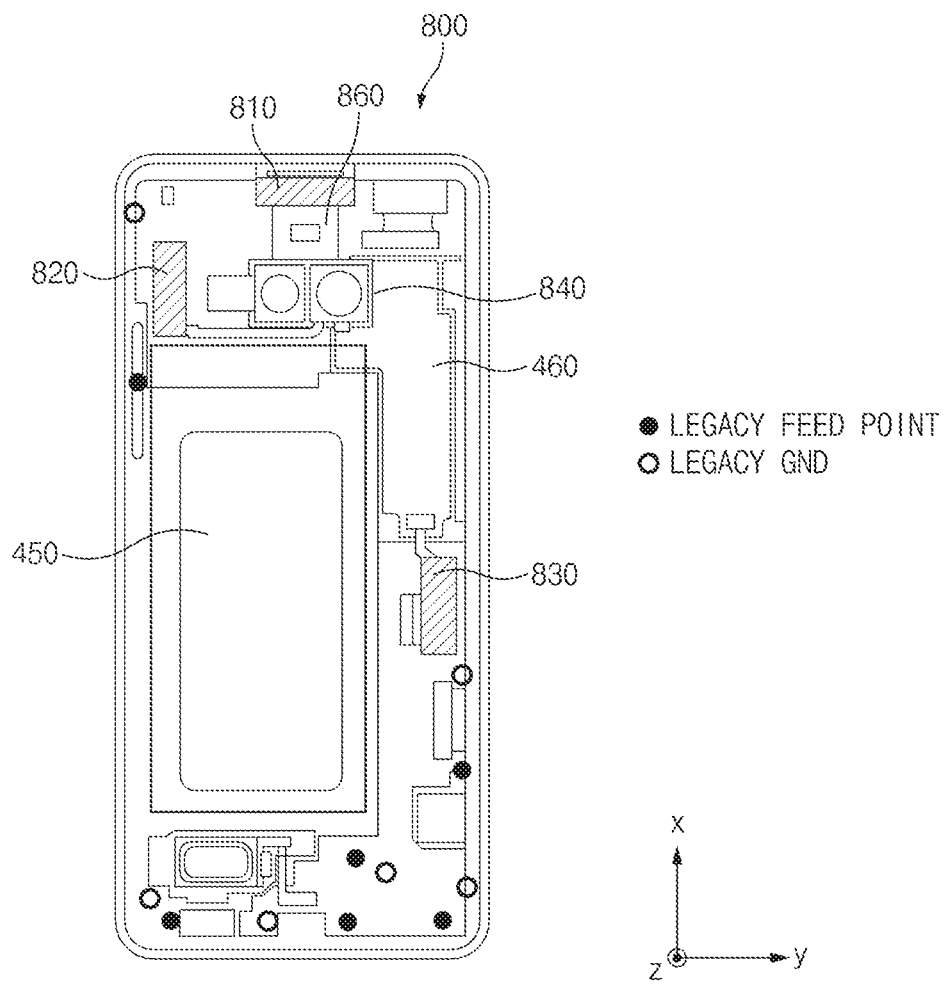
FIG. 8 is a layout diagram of an antenna module of an electronic device according to an embodiment of the disclosure.

FIG. 8 is a layout diagram of an antenna module of an electronic device according to an embodiment of the disclosure.

Referring to FIG. 8, according to an embodiment, an electronic device 800 (e.g., the electronic device 101 of FIG. 1) may include a first antenna module 810, a second antenna module 820, and/or a third antenna module 830. For example, FIG. 8 may illustrate an internal view of the electronic device 800 when the electronic device 800 is viewed from the rear surface of the electronic device 800. For example, FIG. 8 may illustrate the interior of the electronic device 800 when the rear plate and the antenna (e.g., the antenna 470 in FIG. 4) of the electronic device 800 are removed and then the electronic device 800 is viewed in one direction (e.g., −Z axis direction) from the rear surface (e.g., the rear plate 480 in FIG. 4) of the electronic device 800. For another example, FIG. 8 may illustrate the interior of the electronic device 800 when the rear plate, the antenna, and the second support member (e.g., the second support member 460 of FIG. 4) of the electronic device 800 are removed and then the electronic device 800 is viewed in one direction from the rear surface of the electronic device 800.

According to an embodiment, at least part of the side bezel structure 410 (e.g., front metal) may be used as a radiator for transmitting and receiving wireless signals (e.g., wireless signals of 6 GHz or less) of legacy cellular communication (e.g., 3G and 4G mobile communication). For example, the side bezel structure 410 may be at least part of an antenna including a plurality of legacy feed points and/or a plurality of grounds (GNDs).

According to an embodiment, the first antenna module 810 may be positioned at the upper center of the rear surface of the electronic device 800, as illustrated in FIG. 8. For example, the first antenna module 810 may be disposed above a speaker 860. For example, when viewed from the side surface of the electronic device 800 (e.g., +X direction or −X direction), the first antenna module 810 may be disposed so as not to overlap with the speaker 860 (e.g., the sound output device 155 of FIG. 1). For example, the first antenna module 810 may be positioned between the printed circuit board 440 and the rear plate of the electronic device 800.

For example, the first antenna module 810 may correspond to the antenna module 700 of FIG. 7. According to an embodiment, the PCB (e.g., the PCB 750 of FIG. 7) of the first antenna module 810 may be substantially parallel to the central part of the display of the electronic device 800, and may include a plurality of patch-type antenna elements (e.g., the first antenna array 740 of FIG. 7). For example, a plurality of patch-type antenna elements may be disposed on the PCB 750 to form a beam toward the rear surface of the electronic device 800. According to an embodiment, the first antenna module 810 may include a plurality of dipole antenna elements (e.g., the second antenna array 745 of FIG. 7). For example, the plurality of dipole antenna elements may be disposed to generate a beam through a non-display region in front of the electronic device 800.

The second antenna module 820 may be positioned on the upper-left end of the rear surface of the electronic device 800, as illustrated in FIG. 8. For example, when viewed from the side surface of the electronic device 800 (e.g., +X direction or −X direction), the second antenna module 820 may be disposed at a location at least partially overlapping with a camera module 840. For example, the second antenna module 820 may be positioned adjacent to the side bezel structure 410 on the left side of the camera module 840 when viewed from the rear surface of the electronic device 800. For example, the second antenna module 820 may be disposed inside the electronic device 800 such that the PCB of the second antenna module 820 is parallel to the front display or rear plate of the electronic device 800.

According to an embodiment, the second antenna module 820 may correspond to the antenna module 700 of FIG. 7. According to an embodiment, when the electronic device 800 is viewed from the rear surface, the second antenna module 820 may include a plurality of patch-type antenna elements (e.g., the first antenna array 740 of FIG. 7) disposed toward the rear surface of the electronic device 800 (e.g., +Z direction). According to an embodiment, the second antenna module 820 may include a plurality of dipole antenna elements (e.g., the second antenna array 745 of FIG. 7). The second antenna module 820 may generate a beam having a radiation pattern around the left direction (e.g., −Y direction) and the display direction (e.g., the direction between −Y direction and −Z direction on Y-Z plane) of the electronic device 800 from the inside of the electronic device 800, using a plurality of dipole antenna elements.

According to an embodiment, the third antenna module 830 may be positioned at the right side of the rear surface of the electronic device 800, as illustrated in FIG. 8. For example, when viewed from the side surface of the electronic device 800 (e.g., +Y direction or −Y direction), the third antenna module 830 may be disposed at a location at least partially overlapping with the battery 450. For example, the third antenna module 830 may be positioned between the side bezel structure 410 and the battery 450 when viewed from the rear surface of the electronic device 800. For example, the third antenna module 830 may be disposed inside the electronic device 800 such that the PCB of the third antenna module 830 is substantially parallel to the front display or rear plate of the electronic device 800.

According to an embodiment, the third antenna module 830 may correspond to the antenna module 700 of FIG. 7. According to an embodiment, when the electronic device 800 is viewed from the rear surface, the third antenna module 830 may include a plurality of patch-type antenna elements (e.g., the first antenna array 740 of FIG. 7) disposed toward the rear surface of the electronic device 800 (e.g., +Z direction). According to an embodiment, the third antenna module 830 may include a plurality of dipole antenna elements (e.g., the second antenna array 745 of FIG. 7). The third antenna module 830 may generate a beam having a radiation pattern around the right direction (e.g., +Y direction) and the display direction (e.g., the direction between +Y direction and −Z direction on Y-Z plane) of the electronic device 800 from the inside of the electronic device 800, using a plurality of dipole antenna elements.

The layout of the antenna modules described with reference to FIG. 8 is one possible layout, and embodiments of the disclosure are not limited thereto. For example, the number of antenna modules and the locations of the antenna modules are not limited to the example of FIG. 8.

Figure 9:
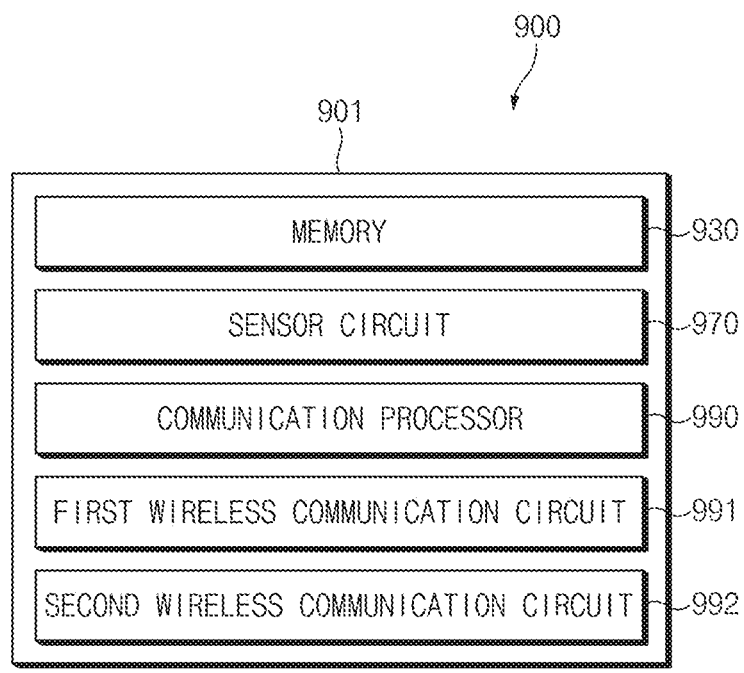
FIG. 9 is a block diagram of an electronic device according to an embodiment of the disclosure.

FIG. 9 is a block diagram of an electronic device according to an embodiment of the disclosure.

Referring to FIG. 9, according to an embodiment, an electronic device (e.g., the electronic device 101 of FIG. 1) may include a memory 930 (e.g., the memory 130 of FIG. 1), a sensor circuit 970 (e.g., the sensor module 176 of FIG. 1), a communication processor 990 (e.g., the communication module 190 of FIG. 1), a first wireless communication circuit 991 (e.g., the first RFIC 522 and/or the second RFIC 524 of FIG. 5), and/or a second wireless communication circuit 992 (e.g., the third RFIC 526 of FIG. 5). For example, the components of the electronic device 900 may be positioned inside a housing 901 (e.g., the housing 210 of FIG. 2) or on the housing 901. The memory 930, the sensor circuit 970, the first wireless communication circuit 991, and the second wireless communication circuit 992 may be operatively connected to the communication processor 990. The configuration of the electronic device 900 illustrated in FIG. 9 is one possible electronic device, and embodiments of the disclosure are not limited thereto. For example, the electronic device 900 may further include a configuration not illustrated in FIG. 9. For another example, the electronic device 900 may not include at least part of the configurations illustrated in FIG. 9.

According to an embodiment, the memory 930 may store one or more instructions that, when executed, cause the communication processor 990 to perform operations of the electronic device 900 or the communication processor 990 to be described later. The memory 930 may be a configuration separately from the communication processor 990 located outside the communication processor 990. For another example, the memory 930 may be implemented inside the communication processor 990; alternatively, the memory 930 and the communication processor 990 may be implemented as a single chip.

According to an embodiment, the sensor circuit 970 may include one or more sensors. For example, the sensor circuit 970 may include a grip sensor for sensing the grip of the electronic device 900. For example, the sensor circuit 970 may include a proximity sensor for detecting an object located adjacent to the electronic device 900. According to an embodiment, the sensor circuit 970 may be operatively connected to the communication processor 990 or may be operatively connected to the communication processor 990 through a processor (e.g., the processor 120 of FIG. 1). For example, the communication processor 990 may receive the data sensed directly from the sensor circuit 970 or the data sensed from the sensor circuit 970 through the processor.

According to an embodiment, the communication processor 990 may include at least one communication processor. For example, the communication processor 990 may include a first communication processor configured to perform communication based on a first radio access technology (RAT) (e.g., long term evolution (LTE)) and a second communication processor configured to perform communication based on a second RAT (e.g., new radio-RAN (NG-RAN)). For another example, the communication processor 990 may include a single communication processor configured to perform communication based on the first RAT and the second RAT. The communication processor 990 may be operatively connected to the first wireless communication circuit 991 and the second wireless communication circuit 992, and may be configured to control the first wireless communication circuit 991 and the second wireless communication circuit 992.

According to an embodiment, the first wireless communication circuit 991 may be configured to provide the first RAT-based communication. For example, the first wireless communication circuit 991 may be configured to transmit and receive signals in a first frequency band (e.g., less than 6 GHz). For example, the first wireless communication circuit 991 may transmit and receive a wireless signal, using at least one antenna configured to transmit and receive signals in the first frequency band. According to an embodiment, at least part of the side member (e.g., the side member 210 of FIG. 2) of the electronic device 900 may be used as at least one antenna configured to transmit and receive signals in a first frequency band.

According to an embodiment, the second wireless communication circuit 992 may be configured to provide the second RAT-based communication. For example, the second wireless communication circuit 992 may be configured to transmit and receive signals in a second frequency band (e.g., 6 GHz or higher).

According to an embodiment, the communication processor 990 may detect an external object of the electronic device 900 and may control the first wireless communication circuit 991 and/or the second wireless communication circuit 992 based on the detection of the external object. For example, the communication processor 990 may control the first wireless communication circuit 991 and/or the second wireless communication circuit 992 based on the distance and/or type of the external object.

According to an embodiment, the communication processor 990 may detect two types of external objects. For example, the communication processor 990 may detect a far area object and/or a near area object. For example, the near area object may refer to an object located within a specific distance from the electronic device 900; the far area object may refer to an object located at a distance greater than or equal to the specific distance from the electronic device 900. For example, the specific distance may be from about 4 cm to about 10 cm.

According to an embodiment, the communication processor 990 may detect the near area object, using the sensor circuit 970 and/or the first wireless communication circuit 991. For example, the communication processor 990 may detect the near area object, using the grip sensor and/or proximity sensor of the sensor circuit 970. For another example, the communication processor 990 may detect the near area object, using the first wireless communication circuit 991. In this case, the communication processor 990 may transmit a signal in the first band, using the first wireless communication circuit 991 and may receive the reflection signal of the transmitted signal, using a feedback reception path of the first wireless communication circuit. The communication processor 990 may detect the near area object based on the magnitudes and phases of the transmission signal and the reflection signal.

According to an embodiment, the communication processor 990 may detect the external object, using the second wireless communication circuit 992. For example, the communication processor 990 may detect the far area object, using the second wireless communication circuit 992. For another example, the communication processor 990 may detect the near area object or the far area object, using the second wireless communication circuit 992. The communication processor 990 transmits a signal in the second band, using the second wireless communication circuit 992 and may measure the reflection signal of the transmitted signal to detect an external object. For example, the communication processor 990 may compare the sizes and phases of the transmission signal and the reflection signal to identify the distance of the external object and/or the type (e.g., a metallic material, a non-metallic material, and/or a human body) of the external object. According to an embodiment, the communication processor 990 may identify the magnitudes and phases of the transmission signal and reflection signal and may identify the type of external object, using the value stored in the memory 930. For example, the memory 930 may include mapping information about the sizes and phases of the transmission signal and the reflection signal and a type of external object. According to an embodiment, the communication processor 990 may identify a difference between a transmission time of the transmission signal and a reception time of the reflection signal, and may determine a distance based on the identified difference. For example, the communication processor 990 may identify a difference between a transmission time and a reception time based on a phase difference between the transmission signal and the reception signal.

Hereinafter, the detection of an external object using the second wireless communication circuit 992 may be described with reference to FIGS. 10 to 13.

Figure 11:
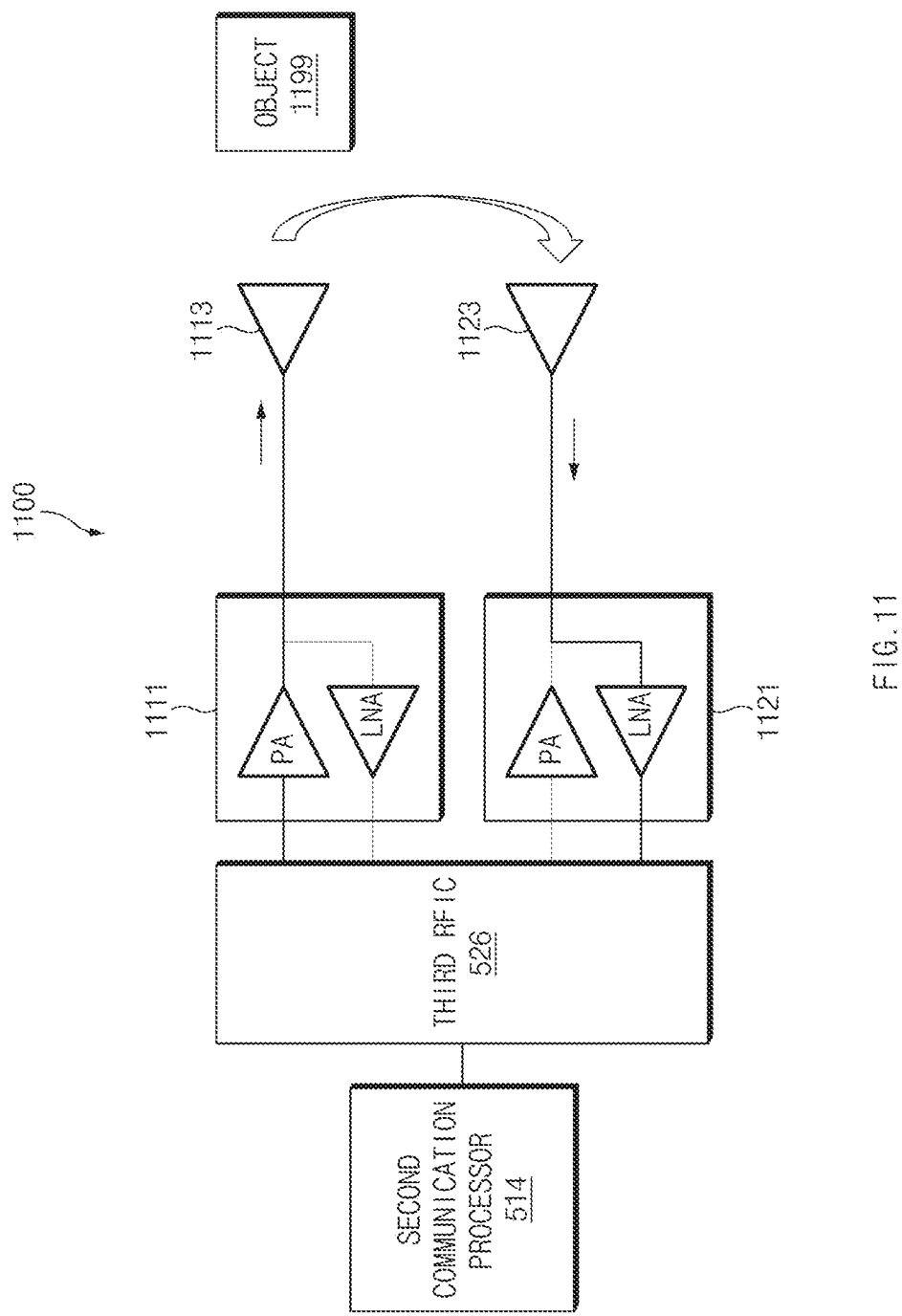
FIG. 11 illustrates a radio frequency (RF) chain configuration for object detection using heterogeneous antenna elements according to an embodiment of the disclosure.

FIG. 11 illustrates an RF chain configuration for object detection using heterogeneous antenna elements according to an embodiment of the disclosure.

According to an embodiment, the communication processor 990 of FIG. 9 may transmit a signal to the first type of antenna element of the second wireless communication circuit 992 and may receive a reflection signal, using the second type of antenna element.

Referring to FIG. 11, in an electronic device 1100, the second communication processor 514 (e.g., the communication processor 990) may transmit a signal, using a first antenna element 1113 connected to the third RFIC 526 through a first transmission/reception chain 1111. For example, the first antenna element 1113 may be a patch-type antenna element. The signal transmitted through the first antenna element 1113 may be reflected by an object 1199. The second communication processor 514 may receive the reflection signal, using the second antenna element 1123 connected to the third RFIC 526 through a second transmission/reception chain 1121. For example, the second antenna element 1123 may be a dipole antenna element. In FIG. 11, it is illustrated that the first antenna element 1113 is a patch antenna element and the second antenna element 1123 is a dipole antenna element, but embodiments of the disclosure are not limited thereto. For another example, the first antenna element 1113 may be a dipole antenna element, and the second antenna element 1123 may be a patch antenna element. For another example, both the first antenna element 1113 and the second antenna element 1123 may be patch antenna elements.

In the example of FIG. 11, the communication processor 990 may detect the external object 1199, using an antenna element that is not used for communication among antenna elements of the second wireless communication circuit 992. For example, in the case of the antenna module 700 of FIG. 7, when the communication processor 990 transmits and receives signals using the first antenna array 740, the communication processor 990 may detect an object, using the second antenna array 745. For another example, when the communication processor 990 transmits and receives signals using the second antenna array 745, the communication processor 990 may detect an object, using the first antenna array 740.

Figure 12:
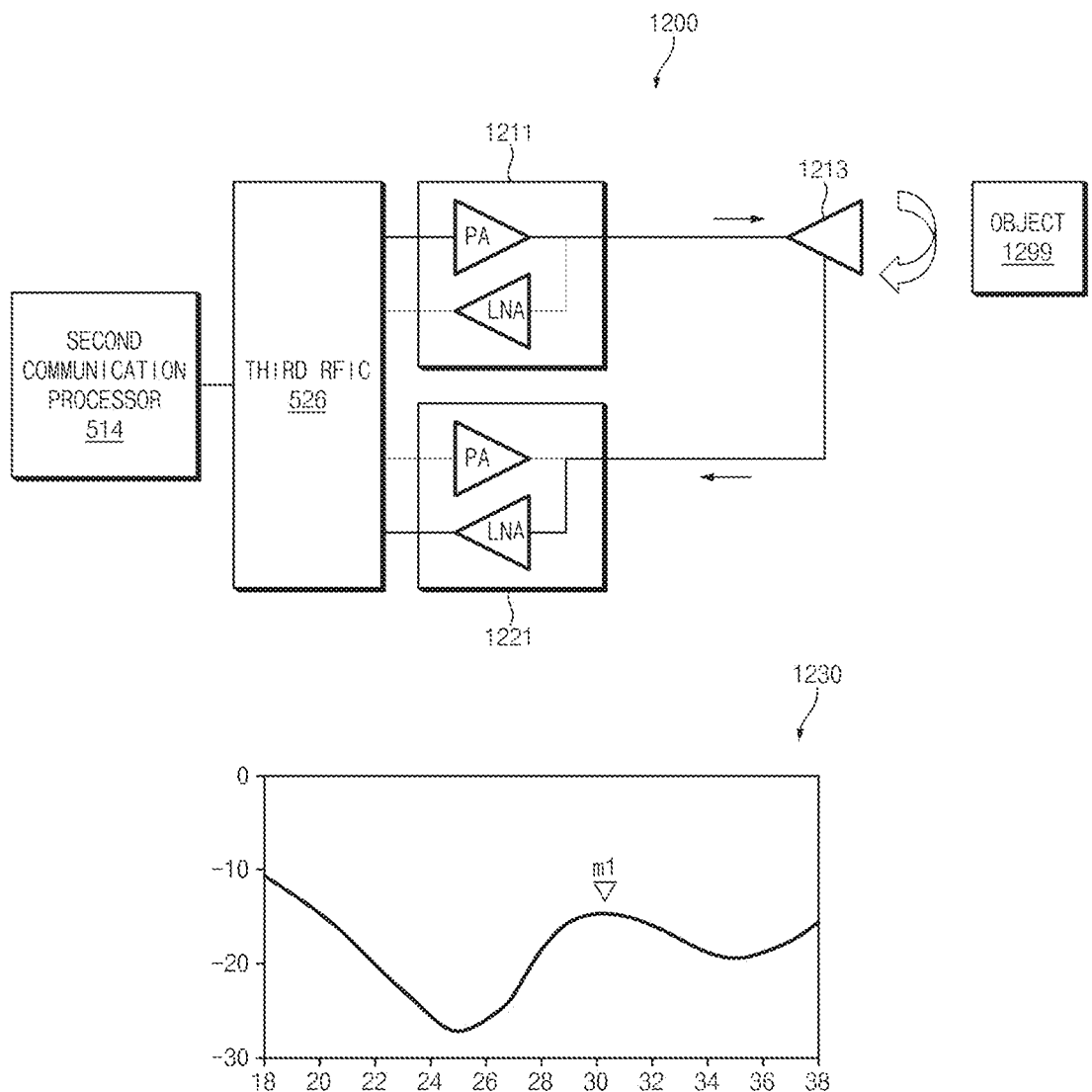
FIG. 12 illustrates an RF chain configuration for object detection using a dual feeding antenna element according to an embodiment of the disclosure.

FIG. 12 illustrates an RF chain configuration for object detection using a dual feeding antenna element according to an embodiment of the disclosure.

For example, an antenna element may be connected to two transmission/reception chains for dual polarization. According to an embodiment, the communication processor 990 may transmit a signal and may receive a reflection signal, using two transmission/reception chains connected to a single antenna element of the second wireless communication circuit 992.

Referring to FIG. 12, for example, in an electronic device 1200, a first transmission/reception chain 1211 is a transmission/reception chain associated with the vertical polarization of a first antenna element 1213; a second transmission/reception chain 1221 may be a transmission/reception chain associated with horizontal polarization of the first antenna element 1213. For another example, the first transmission/reception chain 1211 is a transmission/reception chain associated with the horizontal polarization of the first antenna element 1213; the second transmission/reception chain 1221 may be a transmission/reception chain associated with vertical polarization of the first antenna element 1213.

According to an embodiment, the second communication processor 514 (e.g., the communication processor 990) may transmit a signal, using the first transmission/reception chain 1211 and the first antenna element 1213. The signal transmitted through the first antenna element 1213 may be reflected by an object 1299. The second communication processor 514 may receive the reflection signal, using the first antenna element 1213 connected through the second transmission/reception chain 1221.

In the example of FIG. 12, the second communication processor 514 may detect the object 1299 by comparing the magnitudes and phases of the transmission signal and reflection signal. In this case, the second communication processor 514 may detect the object 1299 in consideration of cross polarization isolation between the first transmission/reception chain 1211 and the second transmission/reception chain 1221. A reference point m1 in the graph of reference numeral 1230 indicates that the isolation performance between two chains associated with a single antenna element according to an example is −15 dB at about 30 GHz. In the graph of reference number 1230, the vertical axis may have the unit of dB and the horizontal axis may have the unit of GHz. The isolation performance may contribute to the protection of low-noise amplifier (LNA). For example, when the reflection signal having a high intensity is received, the LNA may be damaged. When the isolation performance is secured, the reflection signal may be attenuated to prevent the LNA from being damaged.

Figure 13:
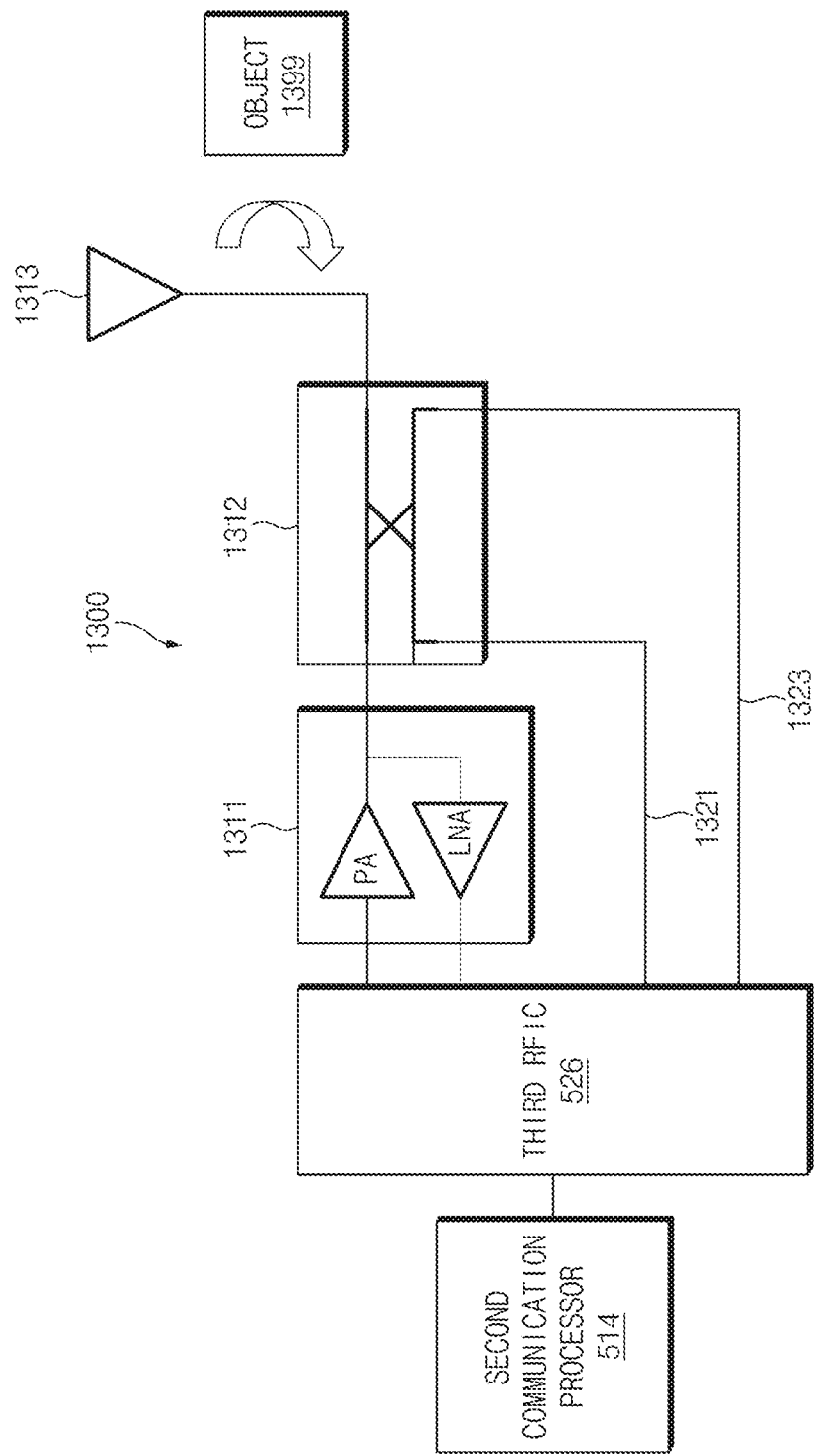
FIG. 13 illustrates an RF chain configuration for object detection using a single antenna element according to an embodiment of the disclosure.

FIG. 13 illustrates an RF chain configuration for object detection using a single antenna element according to an embodiment of the disclosure.

Referring to FIG. 13, according to an embodiment, in an electronic device 1300, a first transmission/reception chain 1311 may further include a coupler 1312. For example, the second communication processor 514 may obtain a transmission signal and a reception signal through a transmission signal path 1321 and a reception signal path 1323 connected to the coupler 1312.

According to an embodiment, the coupler 1312 may be connected to only some of the antenna elements of an antenna module. For example, there may be an antenna element configured to be used to detect an object 1399 among antenna elements of the antenna module. The coupler 1312 may be connected to at least one transmission/reception chain connected to an antenna element 1313 for the detection of the object 1399.

Referring to FIG. 9, the communication processor 990 may detect a near area object at any time, using the sensor circuit 970 and/or the first wireless communication circuit 991. For example, the communication processor 990 may detect a near area object substantially at the same time with the detection of a far area object. For another example, the communication processor 990 may detect a near area object, and then may detect a far area object. For another example, when the near area object is detected, the communication processor 990 may detect a far area object.

According to an embodiment, the communication processor 990 may detect an object (e.g., a far area object and/or a near area object), using the second wireless communication circuit 992 independently of the transmission and reception schedule (e.g., slot format) associated with the second wireless communication circuit 992.

For example, in the example of FIG. 11, a signal may be transmitted and received by using two antenna elements of an antenna array that are not currently used for transmission and reception. In this case, the communication processor 990 may detect an object, using the second wireless communication circuit 992 independently of the transmission and reception schedule (e.g., subframe settings) associated with the second wireless communication circuit 992. According to an embodiment, in the example of FIG. 12, when the antenna element of the second wireless communication circuit 992 is not used for transmission or reception, the communication processor 990 may detect an object using the antenna element. According to an embodiment, in the example of FIG. 13, because the communication processor 990 may obtain a transmission signal and a reception signal using the coupler 1312, the communication processor 990 may detect an object at any time.

Figure 10:
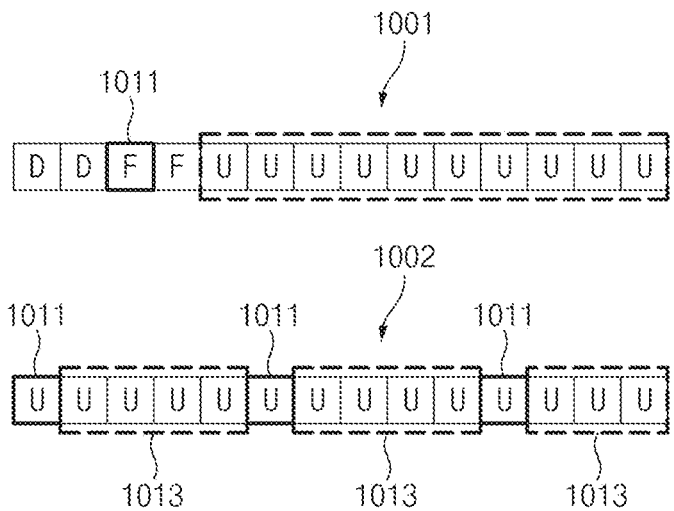
FIG. 10 illustrates slot formats according to an embodiment of the disclosure.

FIG. 10 illustrates slot formats according to an embodiment of the disclosure.

According to an embodiment, the communication processor 990 may detect an object, using the second wireless communication circuit 992 based on the transmission and reception schedule (e.g., slot format) associated with the second wireless communication circuit 992. For example, the communication processor 990 may identify at least one symbol for object detection based on a slot format. The communication processor 990 may allocate at least one symbol among symbols in a slot, as at least one symbol for detecting an object based on a slot format. The communication processor 990 may detect an object at the allocated at least one symbol. For example, the communication processor 990 may transmit a detection signal in the allocated symbol and then may receive a reflection signal of the transmitted detection signal to detect an object.

According to an embodiment, the communication processor 990 may allocate a flexible symbol set depending on a slot format, as a symbol for detecting an object. For example, the communication processor 990 may allocate at least one flexible symbol between an uplink symbol and a downlink symbol, at least one flexible symbol located before the downlink symbol, or at least one flexible symbol located before the uplink symbol, as a symbol for detecting an object. The communication processor 990 may transmit a detection signal in the allocated flexible symbol and then may receive a reflection signal of the transmitted detection signal to detect an object.

Referring to FIG. 10, for example, a first slot format 1001 (e.g., slot format 38) may include flexible symbols between downlink symbols and uplink symbols. In this case, the communication processor 990 may allocate the first flexible symbol as a detection symbol 1011 for detecting an object. The communication processor 990 may detect an external object, using a broad beam (e.g., the broad beam 651 of FIG. 6) in the detection symbol 1011. The communication processor 990 may transmit uplink data, using a sharp beam (e.g., the sharp beam 653 in FIG. 6) in an uplink symbol interval 1013.

According to an embodiment, the communication processor 990 may allocate an uplink symbol set depending on the slot format, as a symbol for detecting an object. For example, all symbols in a second slot format 1002 (e.g., slot format 1) may be uplink symbols. In this case, the communication processor 990 may allocate at least part of the uplink symbols in the slot, as the detection symbol 1011. For example, the communication processor 990 may allocate uplink symbols of a specified symbol interval as the detection symbol 1011. For example, in the detection symbol 1011, the communication processor 990 may detect an external object, using a broad beam (e.g., the broad beam 651 of FIG. 6) in the detection symbol 1011. For another example, the communication processor 990 may simultaneously perform external object detection and uplink data transmission, using a broad beam in the detection symbol 1011. The communication processor 990 may transmit uplink data, using a sharp beam (e.g., the sharp beam 653 in FIG. 6) in the uplink symbol interval 1013.

According to an embodiment, the communication processor 990 may detect an external object, using a beam pattern (e.g., the sharp beam 653 in FIG. 6) used for data transmission. For example, in the example of FIG. 11, the communication processor 990 may transmit uplink data using a first antenna array (e.g., antenna array including the first antenna element 1113) and may receive the reflection signal of the transmitted signal, using the second antenna element 1123 of the second antenna array that is not used for data transmission. For another example, in the example of FIG. 13, the communication processor 990 may detect a transmission signal and a reflection signal, using the coupler 1312.

According to an embodiment, the communication processor 990 may detect an object, using a beam pattern (e.g., the broad beam 651 in FIG. 6) different from the beam pattern (e.g., the sharp beam 653 in FIG. 6) used for data transmission. For example, the communication processor 990 may generate a broad beam for detecting an object, using some antenna elements of the antenna array. In this case, at least some antenna elements of the antenna array may not be used for beam transmission.

According to an embodiment, the phase of the beam pattern for object detection may be the same as the phase of the uplink data beam pattern. The uplink beam pattern and the downlink beam pattern according to an example may be as shown in Table 1 and Table 2 below.

TABLE 1

|  | AE | AE1 | AE2 | AE3 | AE4 |
|---|---|---|---|---|---|
| Data beam pattern | Phase (degree) | 0 | 0 | 0 | 0 |
| Detection beam pattern 1 |  | 0 | OFF | OFF | 0 |
| Detection beam pattern 2 |  | OFF | 0 | 0 | OFF |

TABLE 2

|  | AE | AE1 | AE2 | AE3 | AE4 |
|---|---|---|---|---|---|
| Data beam pattern | Phase (degree) | 0 | 90 | 180 | 270 |
| Detection beam pattern 1 |  | 0 | OFF | OFF | 270 |
| Detection beam pattern 2 |  | OFF | 90 | 180 | OFF |

In Table 1 and Table 2, AE1 may correspond to a first antenna element (e.g., the first patch antenna element 741 of FIG. 7); AE2 may correspond to a second antenna element (e.g., the second patch antenna element 742 of FIG. 7); AE3 may correspond to a third antenna element (e.g., the third patch antenna element 743 of FIG. 7); and AE4 may correspond to a fourth antenna element (e.g., the fourth patch antenna element 744 of FIG. 7).

As shown in Table 1 and Table 2, the antenna element of the data beam pattern used for uplink data transmission may be the same phase as the antenna element of the detection beam pattern used for object detection. For example, to form a broad beam, at least part of antenna elements may not be used to form a beam for detecting an object.

According to an embodiment, the communication processor 990 may detect a near area object or a far area object based on the transmission power of the second wireless communication circuit 992. For example, the communication processor 990 may transmit a signal corresponding to the pattern of the detection beam with first transmission power to detect the near area object and may transmit a signal corresponding to the pattern of the detection beam with a second transmission power higher than the first transmission power to detect the far area object.

According to an embodiment, the communication processor 990 may control the first wireless communication circuit 991 and/or the second wireless communication circuit 992 based on the detection of the external object.

According to an embodiment, the communication processor 990 may perform the power backoff for the first wireless communication circuit 991. For example, when a near area object is detected, the communication processor 990 may perform the power backoff of the first wireless communication circuit 991. The communication processor 990 may adjust the transmission power of the first wireless communication circuit 991 to a specified transmission power or less.

According to an embodiment, when the near area object is detected, the communication processor 990 may control the second wireless communication circuit 992. For example, the controlling of the second wireless communication circuit 992 may include the suppression of a sidelobe and/or a backlobe of the antenna module associated with the second wireless communication circuit 992.

Figure 14:
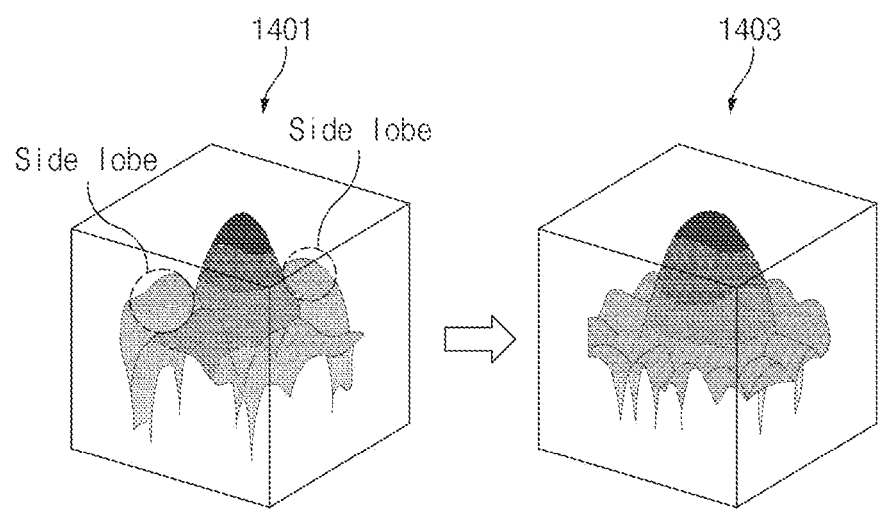
FIG. 14 illustrates beam pattern control according to an embodiment of the disclosure.

FIG. 14 illustrates beam pattern control according to an embodiment of the disclosure.

Referring to FIG. 14, for example, reference number 1401 may illustrate a pattern of the beam generated by an antenna module (e.g., the third antenna module 546 in FIG. 5) associated with the second wireless communication circuit 992. When a near area object is detected, as illustrated in reference numeral 1403, the communication processor 990 may generate a beam pattern in which side lobes are suppressed. For example, the communication processor 990 may suppress a sidelobe and/or a backlobe by applying a weight (e.g., tapered array or Dolph Chebyshev weighting filter) to the antenna array used to form a beam. According to an embodiment, when the near area object is identified as a human's body, the communication processor 990 may suppress the sidelobe and/or the backlobe.

According to an embodiment, the communication processor 990 may perform the backoff of the first wireless communication circuit 991 and/or the second wireless communication circuit 992 based on the detection of near area objects.

According to an embodiment, the communication processor 990 may control the second wireless communication circuit 992 based on the detection of an object. For example, the communication processor 990 may control transmission/reception chains associated with at least part of antenna elements of an antenna module corresponding to a location where the object is detected. For example, the communication processor 990 may apply power backoff, turn-off, and/or weight to at least part of the transmission/reception chains. For example, the communication processor 990 may increase transmission/reception probability by forming the beam pattern of the corresponding antenna module more broadly through the control of at least part of transmission/reception chains. For another example, the communication processor 990 may reduce the mainlobe of the beam of the antenna module associated with the second wireless communication circuit 992 based on the detection of the object.

According to an embodiment, when a near area object and a far area object are detected, the communication processor 990 may control the first wireless communication circuit 991 and the second wireless communication circuit 992. For example, the communication processor 990 may perform the power backoff for the first wireless communication circuit. For example, the communication processor 990 may suppress the mainlobe, sidelobe, and backlobe by the related antenna module, based on the weight for the second wireless communication circuit 992. For another example, the communication processor 990 may perform wireless communication using another antenna module in which a far area object is not detected. In this case, when a near area object and a far area object are detected with respect to all antenna modules of the electronic device 900, the communication processor 990 may perform communication using only the first wireless communication circuit 991.

Figure 15:
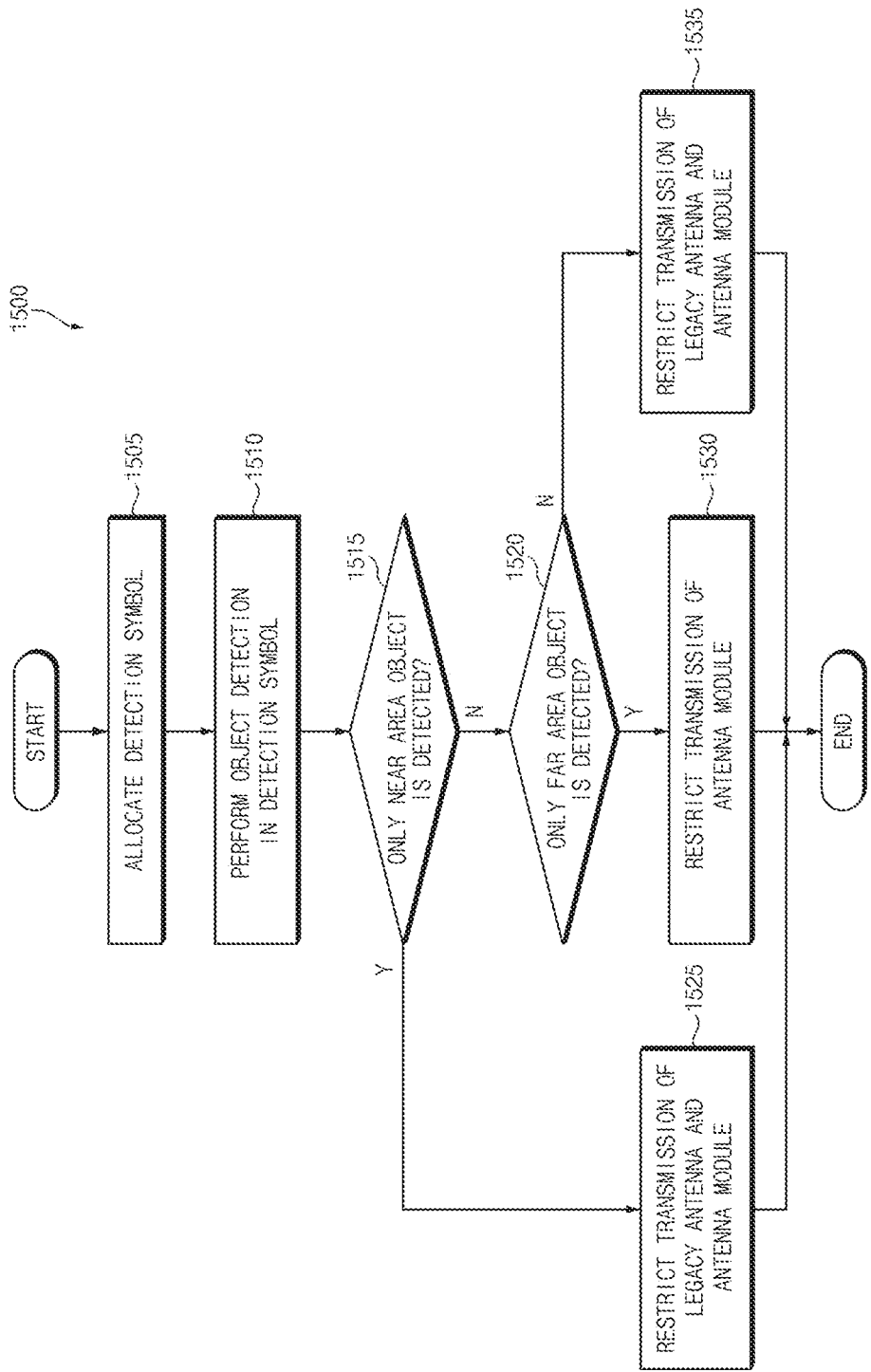
FIG. 15 is a flowchart of a transmission control method according to an embodiment of the disclosure.

FIG. 15 is a flowchart of a transmission control method according to an embodiment of the disclosure.

Referring to FIG. 15, according to an embodiment, in a method 1500, in operation 1505, the communication processor (e.g., the communication processor 990 in FIG. 9) may allocate a detection symbol (e.g., the detection symbol 1011 in FIG. 10). According to an embodiment, the communication processor 990 may allocate a detection symbol depending on the slot format information received from a base station. For example, the communication processor 990 may allocate a flexible symbol (e.g., a flexible symbol before uplink symbol or a flexible symbol after downlink symbol) in a slot as a detection symbol. For another example, the communication processor 990 may allocate an uplink symbol in the slot as the detection symbol.

According to an embodiment, in operation 1510, the communication processor may perform object detection in the detection symbol. For example, the communication processor may detect a far area object and a near area object in the detection symbol. For another example, the communication processor may allocate a detection symbol and may generate a beam for transmitting a detection signal in the detection symbol. The near area object may be detected by receiving the reflection signal of the transmitted detection signal at timing different from the timing of the detection symbol. According to an embodiment, the communication processor 990 may detect a near area object, using the first wireless communication circuit 991 and/or the sensor circuit 970. According to an embodiment, the communication processor 990 may detect a far area object from the detection symbol, using the second wireless communication circuit 992. For example, the communication processor may detect a near area object and/or a far area object depending on the methods described above with reference to FIGS. 9 to 14.

In the following operations, it may be assumed that at least one object has been detected. When an object is not detected, operations described later with reference to FIG. 15 may not be performed.

According to an embodiment, when only the near area object is detected (e.g., when a far area object is not detected) in operation 1515, in operation 1525, the communication processor may restrict the transmission of a legacy antenna and an antenna module (e.g., the third antenna module 546 in FIG. 5). For example, the communication processor may control the second wireless communication circuit (e.g., the second wireless communication circuit 992 in FIG. 9) to perform a power backoff for the legacy antenna (e.g., the power backoff for the first wireless communication circuit 991 in FIG. 9) and to suppress a sidelobe and/or a backlobe by the antenna module.

According to an embodiment, when only the far area object is detected (e.g., when the near area object is not detected) in operation 1520, the communication processor may restrict the transmission of the antenna module (e.g., the third antenna module 546 in FIG. 5) in operation 1530. For example, the communication processor may control the second wireless communication circuit to suppress a mainlobe by the antenna module. In this case, the communication processor may not perform the power backoff for the first wireless communication circuit.

According to an embodiment, when both the far area object and the near area object are detected in operation 1520, the communication processor may restrict the transmission of the legacy antenna and antenna module in operation 1535. For example, the communication processor may control the second wireless communication circuit to suppress the power backoff and the mainlobe, the sidelobe, and/or the backlobe for the first communication circuit.

Figure 16:
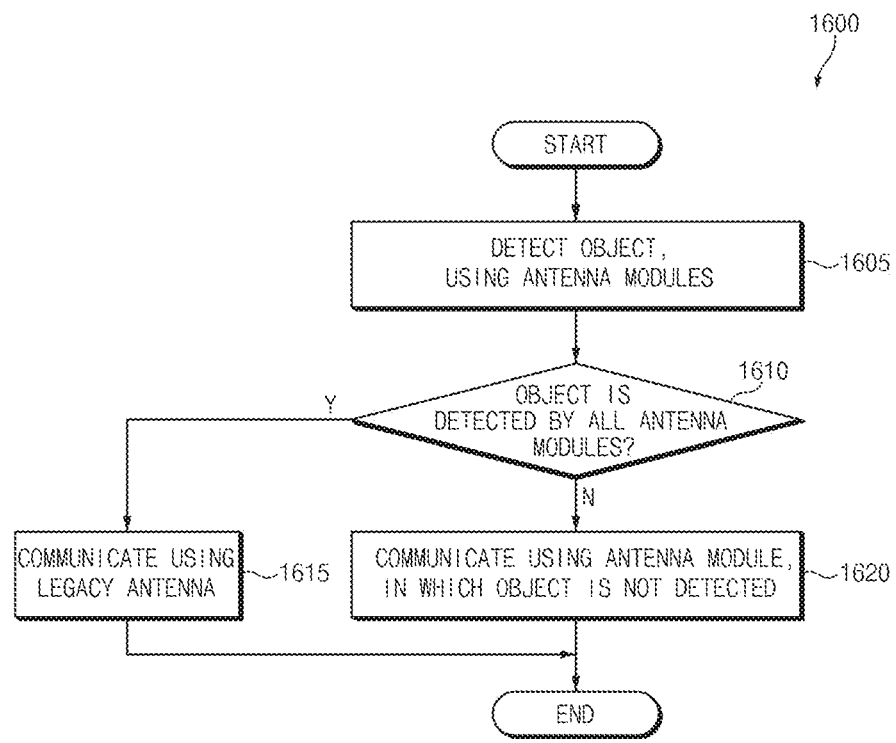
FIG. 16 is a flowchart of a transmission control method according to an embodiment of the disclosure.

FIG. 16 is a flowchart of a transmission control method according to an embodiment of the disclosure.

Referring to FIG. 16, according to an embodiment, in a method 1600 when a near area object is detected and a single far area object is detected through one antenna module, a communication processor (e.g., the communication processor 990 of FIG. 9) may detect an object, using the other antenna module in operation 1605. For example, because the near area object is detected, in operation 1605, the communication processor may detect the far area object using other antenna modules of the electronic device (e.g., the electronic device 900 of FIG. 9). In this case, the communication processor may detect the far area object, using a flexible symbol or an uplink symbol.

According to an embodiment, when an object is detected by all antenna modules in operation 1610, the communication processor may communicate using a legacy antenna (e.g., the antenna connected to the first wireless communication circuit 991 in FIG. 9) in operation 1615. For example, the communication processor may perform radio access technology (RAT) backoff. The communication processor may perform communication based on evolved universal mobile telecommunications system (UMTS) terrestrial radio access network (E-UTRAN) instead of NG-RAT.

According to an embodiment, when there is an antenna module in which an object is not detected, the communication processor may communicate using the antenna module, in which an object is not detected, in operation 1620. In this case, the communication processor may restrict the transmission of a legacy antenna and the antenna module where an object is detected, in operation 1525 of FIG. 15.

Figure 17:
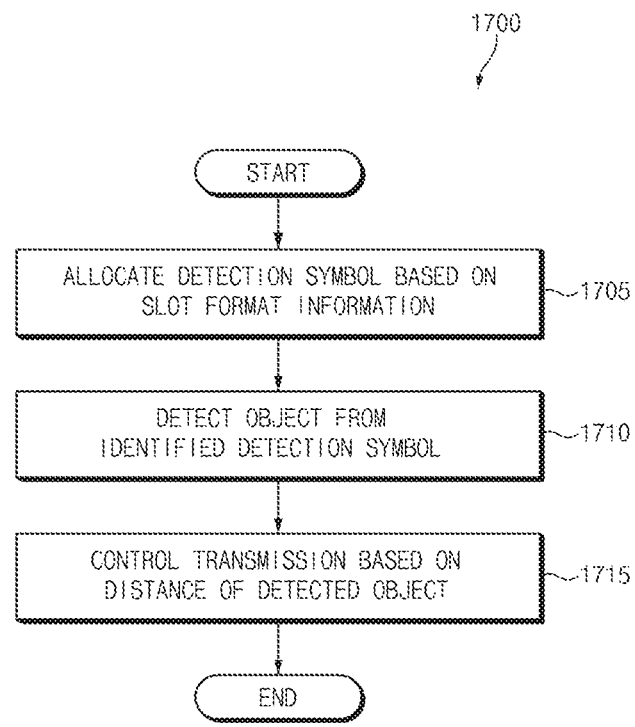
FIG. 17 is a flowchart of a transmission control method according to an embodiment of the disclosure.

FIG. 17 is a flowchart of an antenna changing method according to an embodiment of the disclosure.

Referring to FIG. 17, according to an embodiment, in a method 1700, an electronic device (e.g., the electronic device 900 of FIG. 9) may include a first wireless communication circuit (e.g., the first wireless communication circuit 991 of FIG. 9) configured to provide first RAT (e.g., E-UTRAN), a second wireless communication circuit (e.g., the second wireless communication circuit 992 of FIG. 9) electrically connected to at least one antenna array including a plurality of antenna elements and configured to provide second RAT (e.g., NG-RAN), a communication processor (e.g., the communication processor 990 of FIG. 9) operatively connected to the first wireless communication circuit and the second wireless communication circuit, and a memory (e.g., the memory 930 of FIG. 9) operatively connected to the communication processor. The first wireless communication circuit may be configured to transmit and receive signals of less than 6 GHz, and the second wireless communication circuit may be configured to transmit and receive signals of 6 GHz or more. The memory may store one or more instructions that, when executed, cause the communication processor to perform the operations described later.

According to an embodiment, in operation 1705, the communication processor may allocate a detection symbol based on slot format information. For example, the communication processor may allocate an uplink symbol or a flexible symbol among a plurality of symbols indicated by the slot format information, as a detection symbol.

According to an embodiment, in operation 1710, the communication processor may detect a near area object. For example, the communication processor may detect a near area object, using a first wireless communication circuit configured to provide the first RAT. For another example, the communication processor may detect the near area object using the sensor circuit of the electronic device.

According to an embodiment, in operation 1715, a communication processor may detect an object (e.g., a far area object). For example, the communication processor may transmit a signal in the detection symbol by using a second wireless communication circuit, may receive a reflection signal of the transmitted signal by using a second wireless communication circuit, and may detect an object.

According to an embodiment, to detect the object, the communication processor may transmit a signal in the detection symbol, using some of a plurality of antenna elements of the at least one antenna array, using the second wireless communication circuit.

For example, the at least one antenna array may include a first antenna array and a second antenna array. The communication processor may transmit a signal using the first antenna element of the first antenna array, may receive the reflection signal of the transmitted signal, using the second antenna element of the second antenna array, and may detect the far area object by comparing the transmitted signal and the reflection signal. The polarization associated with the first antenna array may be substantially perpendicular to the polarization of the second antenna array.

For example, the at least one antenna array may include a first antenna array including a plurality of patch antenna elements. The communication processor may transmit a signal through a first transmission/reception chain connected to the first antenna element of the first antenna array, may receive the reflection signal of the transmitted signal through a second transmission/reception chain connected to the first antenna element, and may detect the far area object by comparing the transmitted signal and the reflection signal. For example, the polarization associated with the first transmission/reception chain may be substantially perpendicular to the polarization associated with the second transmission/reception chain.

For example, the at least one antenna array may include a first antenna array including a plurality of patch antenna elements. The communication processor may transmit a signal through a first transmission/reception chain connected to the first antenna element of the first antenna array, may receive the reflection signal of the transmitted signal through a second transmission/reception chain connected to the first antenna element, and may detect the far area object by comparing the transmitted signal and the reflection signal. The polarization associated with the first transmission/reception chain may be substantially perpendicular to the polarization associated with the second transmission/reception chain.

For example, the at least one antenna array may include a first antenna array including a plurality of patch antenna elements. The communication processor may transmit a signal through a first transmission/reception chain connected to the first antenna element of the first antenna array, may receive the reflection signal of the transmitted signal through the first transmission/reception chain connected to the first antenna element, and may detect the far area object by receiving and comparing the transmitted signal and the reflection signal through a coupler connected to the first antenna element.

According to an embodiment, in operation 1715, the communication processor may control transmission based on the detected object. According to an embodiment, when the near area object is detected, the communication processor may adjust the transmission power of the first wireless communication circuit to be less than or equal to a predetermined power. According to an embodiment, when the near area object is detected, the communication processor may control the second wireless communication circuit to suppress the sidelobe of the beam pattern by the at least one antenna array. According to an embodiment, when the far area object is detected, the communication processor may control the second wireless communication circuit to suppress the mainlobe of the beam pattern by the at least one antenna array.

According to an embodiment, an electronic device (e.g., the electronic device 900 of FIG. 9) may include a second wireless communication circuit (e.g., the second wireless communication circuit 992 of FIG. 9) electrically connected to at least one antenna array including a plurality of antenna elements and configured to provide second RAT (e.g., NG-RAN), a communication processor (e.g., the communication processor 990 of FIG. 9) operatively connected to the first wireless communication circuit and the second wireless communication circuit, and a memory (e.g., the memory 930 of FIG. 9) operatively connected to the communication processor. The memory may store one or more instructions that, when executed, cause the communication processor to perform the operations described later.

According to an embodiment, the one or more instructions may, when executed, cause the communication processor to allocate an uplink symbol or a flexible symbol among a plurality of symbols indicated by slot format information, as a detection symbol, to detect an object by transmitting a signal in the detection symbol and receiving a reflection signal of the transmitted signal, using the second wireless communication circuit, and to control transmission of the second wireless communication circuit, based on the detected result of the object.

According to an embodiment, the electronic device may further include a first wireless communication circuit (e.g., the first wireless communication circuit 991 of FIG. 9) operatively connected to the communication processor and providing first RAT (e.g., E-UTRAN). For example, the first wireless communication circuit may be configured to transmit and receive a signal of less than 6 GHz and may be operatively connected to the communication processor. The second wireless communication circuit may be configured to transmit and receive a signal of 6 GHz or more.

According to an embodiment, the at least one antenna array may include a first antenna array and a second antenna array. The one or more instructions may, when executed, cause the communication processor to transmit a signal in the detection symbol, using a first antenna element of the first antenna array, to receive a reflection signal of the transmitted signal using a second antenna element of the second antenna array, and to detect the object by comparing the transmitted signal and the reflection signal. For example, antenna elements of the first antenna array may be different in type from antenna elements of the second antenna array.

According to an embodiment, the at least one antenna array may include a first antenna array including a plurality of patch antenna elements. The one or more instructions may, when executed, cause the communication processor to transmit a signal through a first transmission/reception chain connected to the first antenna element of the first antenna array, to receive the reflection signal of the transmitted signal through a second transmission/reception chain connected to the first antenna element, and to detect the object by comparing the transmitted signal and the reflection signal. For example, the polarization associated with the first transmission/reception chain may be substantially perpendicular to the polarization associated with the second transmission/reception chain.

According to an embodiment, the at least one antenna array may include a first antenna array including a plurality of antenna elements. The one or more instructions may, when executed, cause the communication processor to transmit a signal through a first transmission/reception chain connected to the first antenna element of the first antenna array, to receive the reflection signal of the transmitted signal through the first transmission/reception chain connected to the first antenna element, and to detect the object by receiving and comparing the transmitted signal and the reflection signal through a coupler connected to the first antenna element.

According to an embodiment, the one or more instructions may, when executed, cause the communication processor to detect a near area object, using the first wireless communication circuit, and to adjust transmission power of the first wireless communication circuit to be less than or equal to a set power when the near area object is detected.

According to an embodiment, the one or more instructions may, when executed, cause the communication processor to control the second wireless communication circuit to suppress a sidelobe of a beam pattern by the at least one antenna array when the near area object is detected.

According to an embodiment, the one or more instructions may, when executed, cause the communication processor to control the second wireless communication circuit to suppress a mainlobe of the beam pattern by the at least one antenna array when the object is detected.

According to an embodiment, the one or more instructions may, when executed, cause the communication processor to transmit a signal in the detection symbol, using some of a plurality of antenna elements of the at least one antenna array by using the second wireless communication circuit to detect the object.

According to an embodiment, a transmission control method of an electronic device may include allocating an uplink symbol or a flexible symbol among a plurality of symbols indicated by slot format information, as a detection symbol, detecting an object by transmitting a signal in the detection symbol and receiving a reflection signal of the transmitted signal, using a second wireless communication circuit electrically connected to at least one antenna array including a plurality of antenna elements and configured to provide second RAT, and controlling transmission of the second wireless communication circuit, based on the detected result of the object.

According to an embodiment, the method may further include detecting a near area object, using a first wireless communication circuit configured to provide first RAT. For example, the first wireless communication circuit may be configured to transmit and receive signals of less than 6 GHz, and the second wireless communication circuit may be configured to transmit and receive signals of 6 GHz or more.

According to an embodiment, the at least one antenna array may include a first antenna array and a second antenna array. For example, the detecting of the object may include transmitting a signal through a first transmission/reception chain connected to a first antenna element of the first antenna array, receiving a reflection signal of the transmitted signal through a second transmission/reception chain connected to the first antenna element, and detecting the object by comparing the transmitted signal and the reflection signal.

According to an embodiment, the first antenna array and the second antenna array may include different types of antenna elements from each other.

According to an embodiment, the at least one antenna array may include a first antenna array including a plurality of patch antenna elements. For example, the detecting of the object may include transmitting a signal through a first transmission/reception chain connected to a first antenna element of the first antenna array, receiving a reflection signal of the transmitted signal through the first transmission/reception chain connected to the first antenna element, and detecting the object by receiving and comparing the transmitted signal and the reflection signal through a coupler connected to the first antenna element. The polarization associated with the first transmission/reception chain may be substantially perpendicular to the polarization associated with the second transmission/reception chain.

According to an embodiment, the at least one antenna array may include a first antenna array including a plurality of patch antenna elements. For example, the detecting of the object may include transmitting a signal through a first transmission/reception chain connected to a first antenna element of the first antenna array, receiving a reflection signal of the transmitted signal through the first transmission/reception chain connected to the first antenna element, and detecting the object by receiving and comparing the transmitted signal and the reflection signal through a coupler connected to the first antenna element.

According to an embodiment, the method may further include adjusting transmission power of the first wireless communication circuit to be less than or equal to a set power when the near area object is detected. For example, the method may further include controlling the second wireless communication circuit to suppress a sidelobe of a beam pattern by the at least one antenna array when the near area object is detected.

For example, the method may further include controlling the second wireless communication circuit to suppress a mainlobe of the beam pattern by the at least one antenna array when a far area object is detected.

According to an embodiment, the detecting of the object by transmitting the signal in the detection symbol and receiving the reflection signal of the transmitted signal by using the second wireless communication circuit may include transmitting a signal in the detection symbol, using some of a plurality of antenna elements of the at least one antenna array by using the second wireless communication circuit to detect the object.

According to an embodiment disclosed in the specification, an electronic device may detect the blockage without a separate grip sensor by detecting the blockage using a radio frequency (RF) chain.

According to an embodiment disclosed in the specification, the electronic device may perform various backoffs based on the detected type of external object.

Besides, a variety of effects directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first wireless communication circuit configured to provide first radio access technology (RAT) corresponding to long term evolution (LTE);
   a second wireless communication circuit electrically connected to at least one antenna array comprising a plurality of antenna elements and configured to provide a RAT corresponding to new radio (NR);
   a communication processor operatively connected to the first wireless communication circuit and the second wireless communication circuit; and
   a memory operatively connected to the communication processor,
   wherein the memory stores one or more instructions that, when executed by at least one processor, cause the communication processor to:
      allocate an uplink symbol or a flexible symbol among a plurality of symbols indicated by slot format information, as a detection symbol,
      detect an object by transmitting a signal in the detection symbol and receiving a reflection signal of the transmitted signal, using the second wireless communication circuit,
      when the detected object corresponds to a near area object, perform a power backoff for the first wireless communication circuit and control transmission of the second wireless communication circuit by suppressing a sidelobe or a backlobe of the at least one antenna array, and
      when the detected object corresponds to a far area object, control transmission of the second wireless communication circuit by suppressing a mainlobe of the at least one antenna array.

2. The electronic device of claim 1,
   wherein the first wireless communication circuit is configured to transmit and receive a signal of less than 6 gigahertz (GHz), and
   wherein the second wireless communication circuit is configured to transmit and receive a signal of 6 GHz or more.

3. The electronic device of claim 1,
   wherein the at least one antenna array further comprises a first antenna array and a second antenna array, and
   wherein the one or more instructions, when executed by at least one processor, further cause the communication processor to:
      transmit a signal in the detection symbol, using a first antenna element of the first antenna array;
      receive a reflection signal of the transmitted signal using a second antenna element of the second antenna array; and
      detect the object by comparing the transmitted signal and the reflection signal.

4. The electronic device of claim 3, wherein antenna elements of the first antenna array are different in type from antenna elements of the second antenna array.

5. The electronic device of claim 1,
   wherein the at least one antenna array comprises a first antenna array comprising a plurality of patch antenna elements,
   wherein the one or more instructions, when executed by the at least one processor, further cause the communication processor to:
      transmit a signal in the detection symbol through a first transmission/reception chain connected to a first antenna element of the first antenna array,
      receive a reflection signal of the transmitted signal through a second transmission/reception chain connected to the first antenna element, and
      detect the object by comparing the transmitted signal and the reflection signal, and
   wherein polarization associated with the first transmission/reception chain is substantially perpendicular to polarization associated with the second transmission/reception chain.

6. The electronic device of claim 1,
   wherein the at least one antenna array further comprises a first antenna array comprising a plurality of antenna elements, and
   wherein the one or more instructions, when executed by the at least one processor, further cause the communication processor to:
      transmit a signal in the detection symbol through a first transmission/reception chain connected to a first antenna element of the first antenna array,
      receive a reflection signal of the transmitted signal through the first transmission/reception chain connected to the first antenna element, and
      detect the object by receiving and comparing the transmitted signal and the reflection signal through a coupler connected to the first antenna element.

7. The electronic device of claim 1, wherein the one or more instructions, when executed by the at least one processor, further cause the communication processor to:
   perform the power backoff by adjusting transmission power of the first wireless communication circuit to be less than or equal to a set power.

8. The electronic device of claim 1, wherein the one or more instructions, when executed by the at least one processor, further cause the communication processor to:
   transmit a signal in the detection symbol, using some of a plurality of antenna elements of the at least one antenna array by using the second wireless communication circuit to detect the object.

9. A transmission control method of an electronic device, the transmission control method comprising:
   allocating an uplink symbol or a flexible symbol among a plurality of symbols indicated by slot format information, as a detection symbol;
   detecting an object by transmitting a signal in the detection symbol and receiving a reflection signal of the transmitted signal, using a second wireless communication circuit electrically connected to at least one antenna array comprising a plurality of antenna elements and configured to provide second radio access technology (RAT) corresponding to new radio (NR);
   when the detected object corresponds to a near area object, performing a power backoff for a first wireless communication circuit of the electronic device and controlling transmission of the second wireless communication circuit by suppressing a sidelobe or a backlobe of the at least one antenna array, the first wireless communication circuit configured to provide a first RAT corresponding to long term evolution (LTE); and
   when the detected object corresponds to a far area object, controlling transmission of the second wireless communication circuit by suppressing a mainlobe of the at least one antenna array.

10. The transmission control method of claim 9,
    wherein the at least one antenna array further comprises a first antenna array comprising a plurality of patch antenna elements, and wherein the detecting of the object comprises:
- transmitting a signal through a first transmission/reception chain connected to a first antenna element of the first antenna array;
- receiving a reflection signal of the transmitted signal through the first transmission/reception chain connected to the first antenna element; and
- detecting the object by receiving and comparing the transmitted signal and the reflection signal through a coupler connected to the first antenna element.

11. The transmission control method of claim 9,
wherein the detecting of the object by transmitting the signal in the detection symbol, and
wherein receiving the reflection signal of the transmitted signal by using the second wireless communication circuit comprises:
- transmitting a signal in the detection symbol, using some of a plurality of antenna elements of the at least one antenna array by using the second wireless communication circuit to detect the object.

12. The transmission control method of claim 9,
wherein the first wireless communication circuit is configured to transmit and receive a signal of less than 6 gigahertz (GHz), and
wherein the second wireless communication circuit is configured to transmit and receive a signal of 6 GHz or more.

13. The transmission control method of claim 9,
wherein the at least one antenna array further comprises a first antenna array and a second antenna array, and
wherein the detecting of the object comprises:
- transmitting a signal, using a first antenna element of the first antenna array;
- receiving a reflection signal of the transmitted signal, using a second antenna element of the second antenna array; and
- detecting the object by comparing the transmitted signal and the reflection signal.

14. The transmission control method of claim 13, wherein the first antenna array and the second antenna array comprise different types of antenna elements from each other.

15. The transmission control method of claim 9,
wherein the at least one antenna array comprises a first antenna array comprising a plurality of patch antenna elements,
wherein the detecting of the object comprises:
- transmitting a signal through a first transmission/reception chain connected to a first antenna element of the first antenna array;
- receiving a reflection signal of the transmitted signal through a second transmission/reception chain connected to the first antenna element; and
- detecting the object by comparing the transmitted signal and the reflection signal, and
wherein polarization associated with the first transmission/reception chain is substantially perpendicular to polarization associated with the second transmission/reception chain.

* * * * *